May 8, 1962  H. G. HENRICKSON  3,033,264
APPARATUS AND METHOD USED IN MAKING A CAN BODY
Filed March 2, 1960  16 Sheets-Sheet 1

INVENTOR.
HENRY G. HENRICKSON
BY *James E. Toomey*
ATTORNEY

May 8, 1962 H. G. HENRICKSON 3,033,264
APPARATUS AND METHOD USED IN MAKING A CAN BODY
Filed March 2, 1960 16 Sheets-Sheet 2

INVENTOR.
HENRY G. HENRICKSON
BY James E. Toomey
ATTORNEY

INVENTOR.
HENRY G. HENRICKSON
BY James E. Toomey
ATTORNEY

May 8, 1962 H. G. HENRICKSON 3,033,264
APPARATUS AND METHOD USED IN MAKING A CAN BODY
Filed March 2, 1960 16 Sheets-Sheet 5

INVENTOR.
HENRY G. HENRICKSON
BY
James E. Toomey
ATTORNEY

May 8, 1962 H. G. HENRICKSON 3,033,264
APPARATUS AND METHOD USED IN MAKING A CAN BODY
Filed March 2, 1960 16 Sheets-Sheet 6

INVENTOR.
HENRY G. HENRICKSON
BY
James E. Toomey
ATTORNEY

INVENTOR.
HENRY G. HENRICKSON
BY
James E. Toomey
ATTORNEY

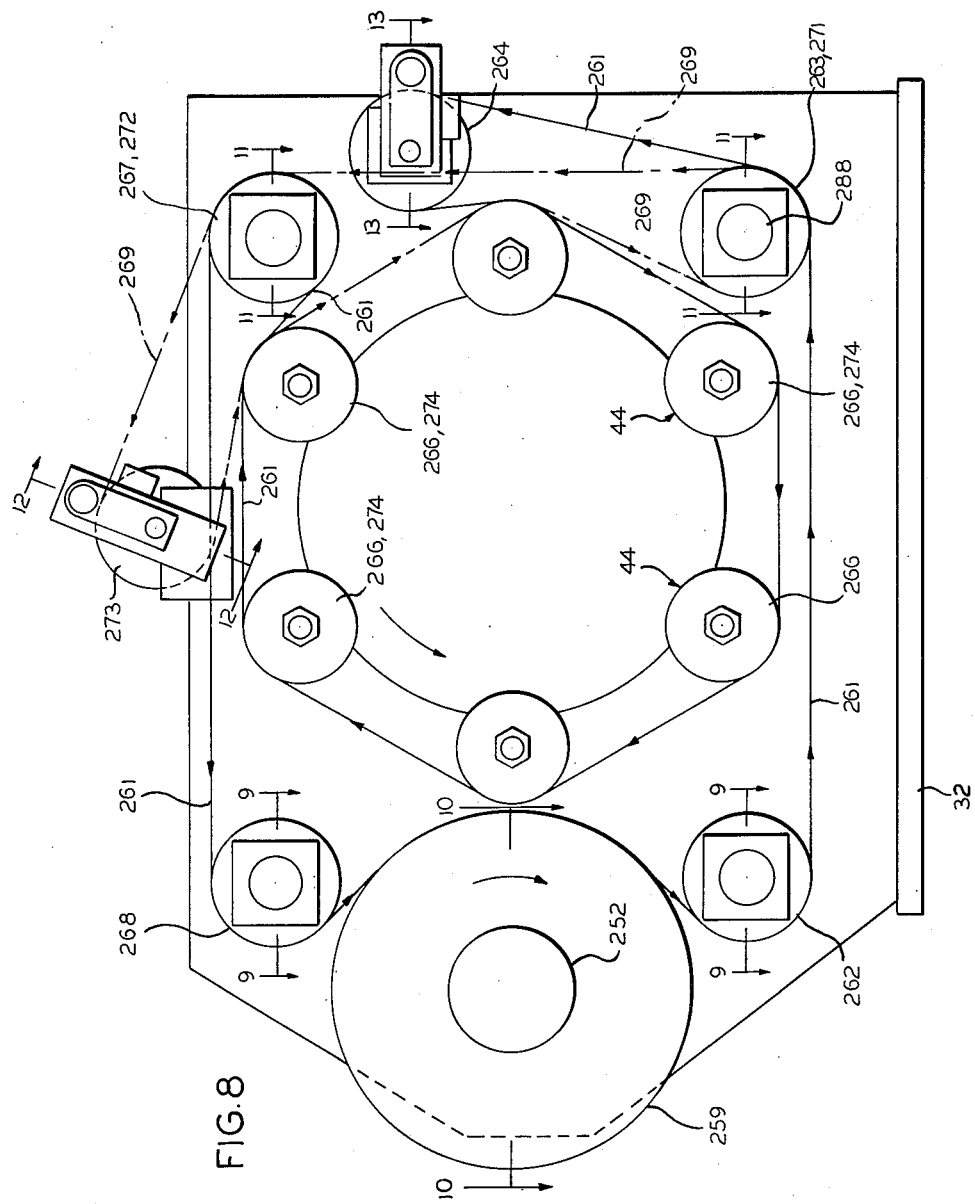

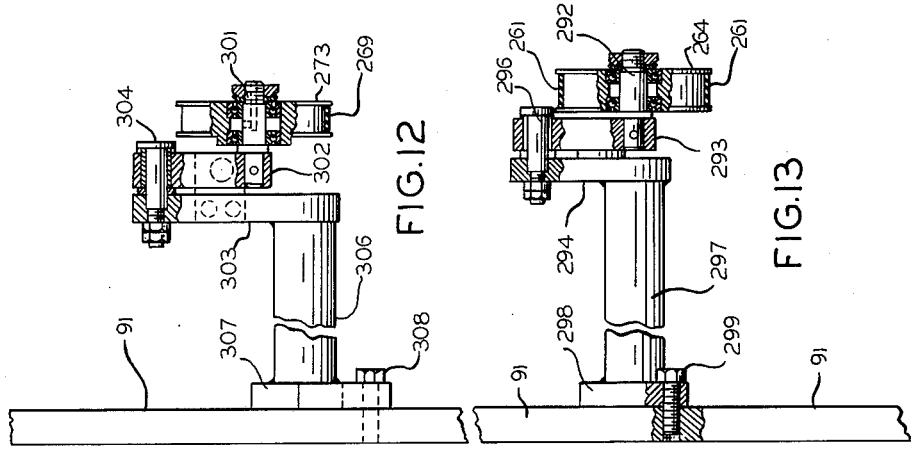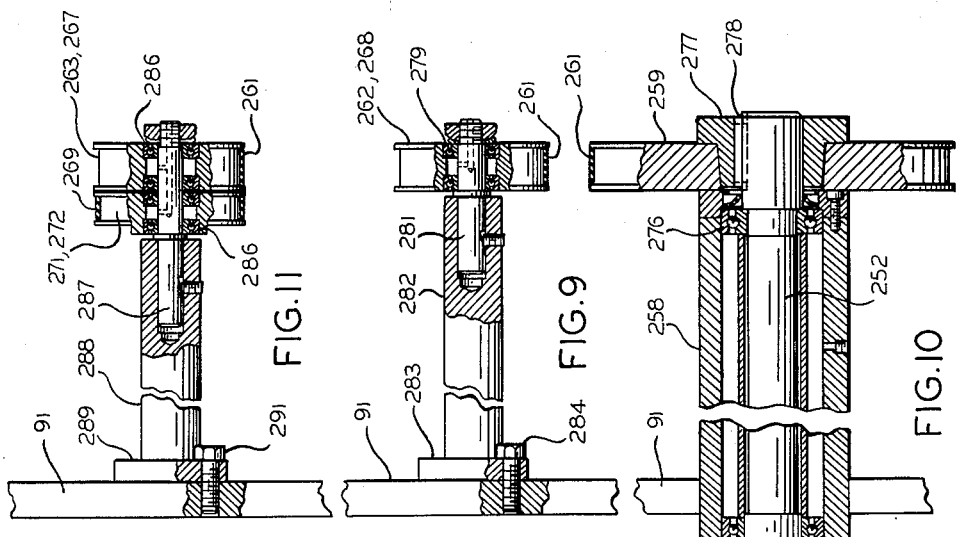

May 8, 1962    H. G. HENRICKSON    3,033,264
APPARATUS AND METHOD USED IN MAKING A CAN BODY
Filed March 2, 1960    16 Sheets-Sheet 10
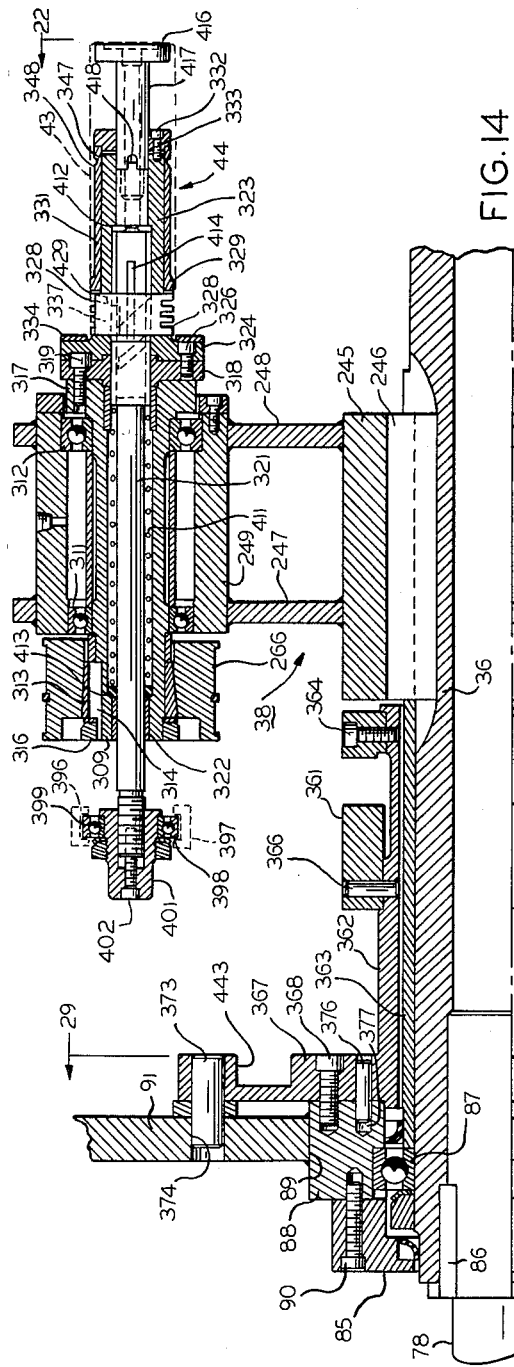
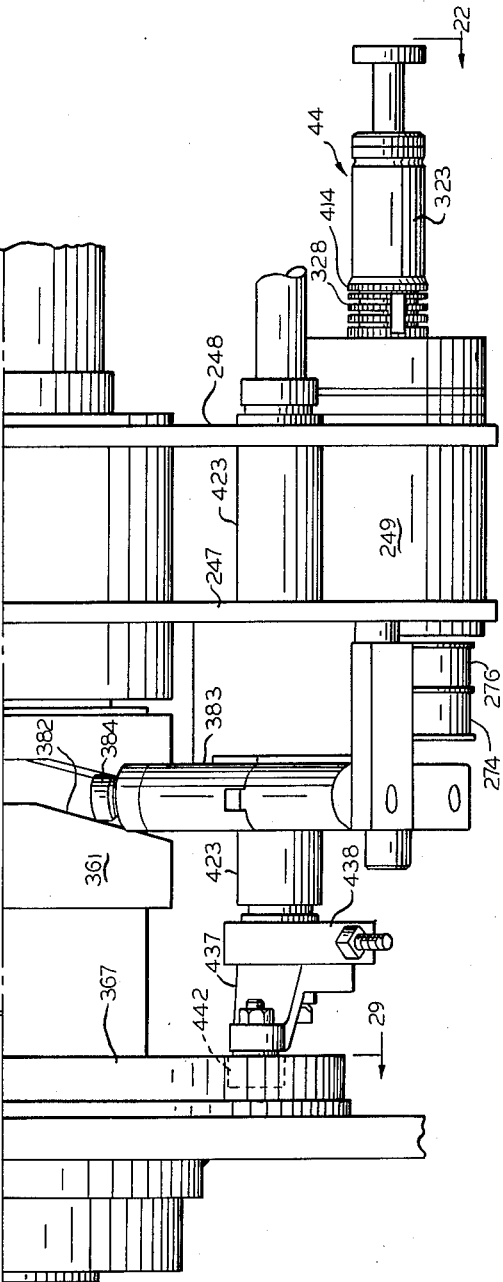
FIG.14
INVENTOR.
HENRY G. HENRICKSON
BY James E. Toomey
ATTORNEY May 8, 1962  H. G. HENRICKSON  3,033,264
APPARATUS AND METHOD USED IN MAKING A CAN BODY
Filed March 2, 1960  16 Sheets-Sheet 11
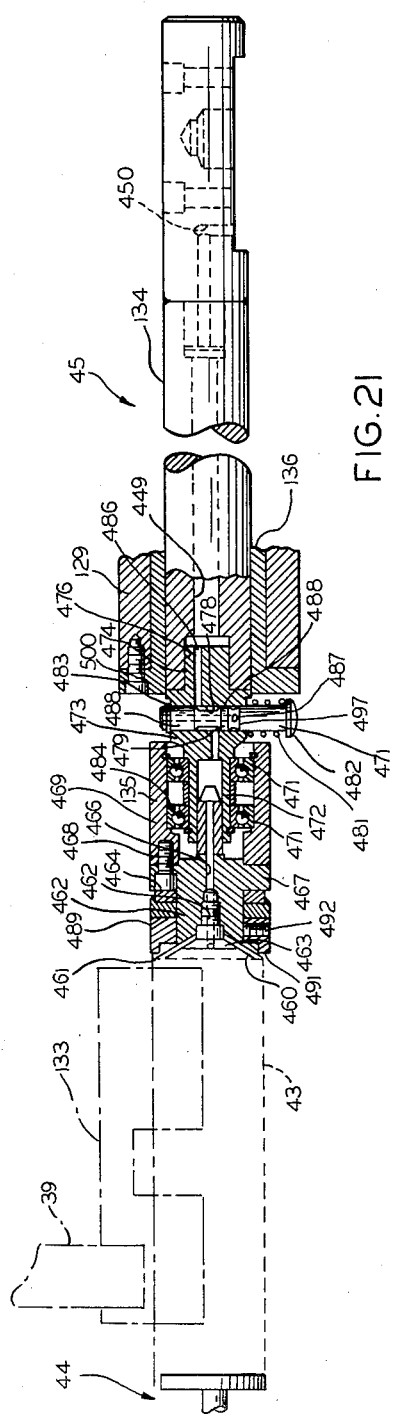
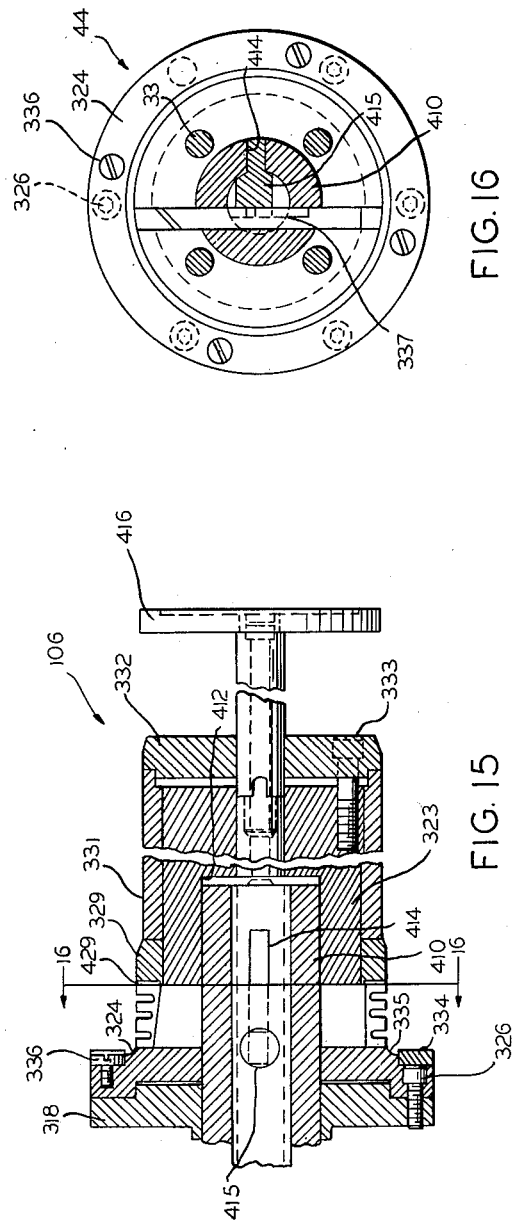
INVENTOR.
HENRY G. HENRICKSON
BY
James E. Toomey
ATTORNEY May 8, 1962   H. G. HENRICKSON   3,033,264
APPARATUS AND METHOD USED IN MAKING A CAN BODY
Filed March 2, 1960   16 Sheets-Sheet 12

INVENTOR.
HENRY G. HENRICKSON
BY
James E. Toomey
ATTORNEY

May 8, 1962  H. G. HENRICKSON  3,033,264
APPARATUS AND METHOD USED IN MAKING A CAN BODY
Filed March 2, 1960  16 Sheets-Sheet 13
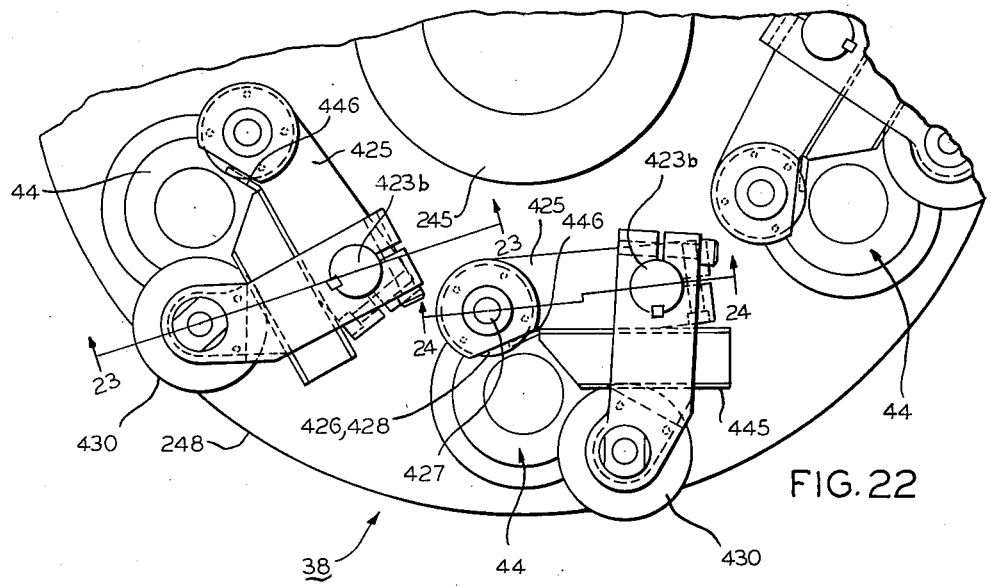
FIG. 22
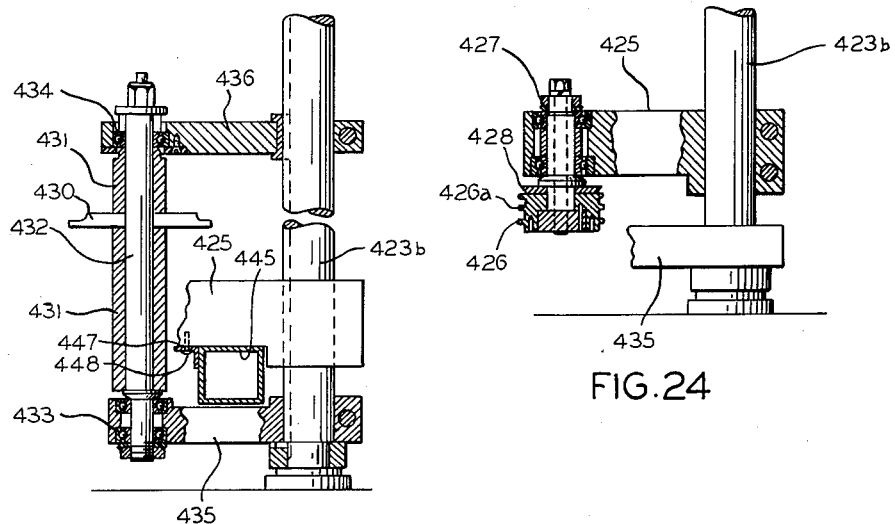
FIG. 23
FIG. 24
INVENTOR.
HENRY G. HENRICKSON
BY
James E. Toomey
ATTORNEY INVENTOR.
HENRY G. HENRICKSON
BY
James E. Toomey
ATTORNEY

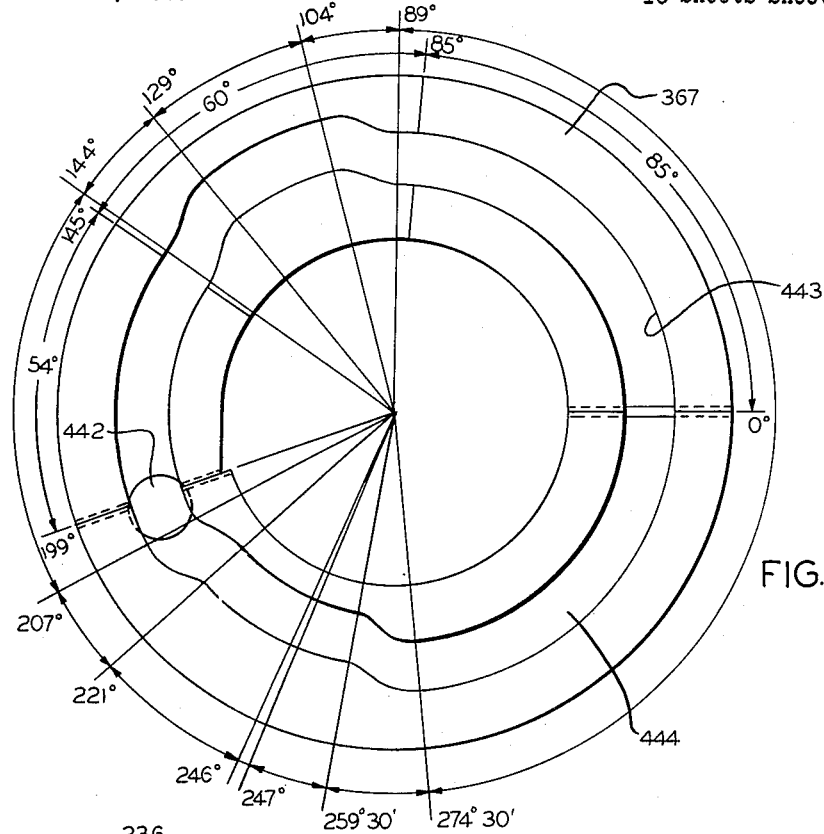
FIG. 29
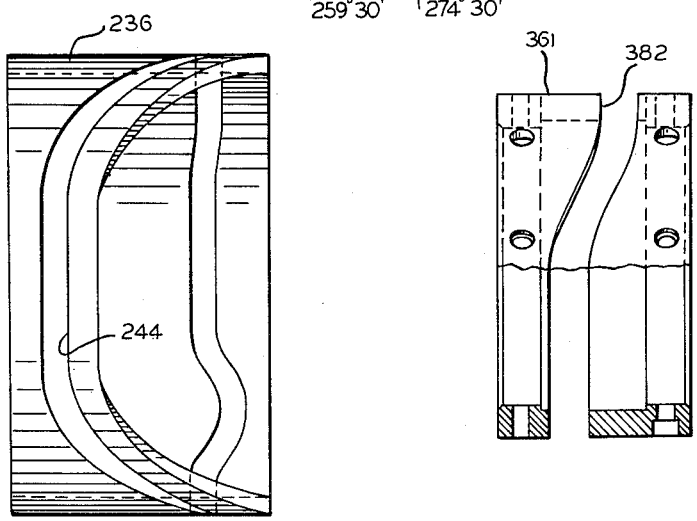
FIG. 30
FIG. 28
INVENTOR.
HENRY G. HENRICKSON
BY
James E. Toomey
ATTORNEY

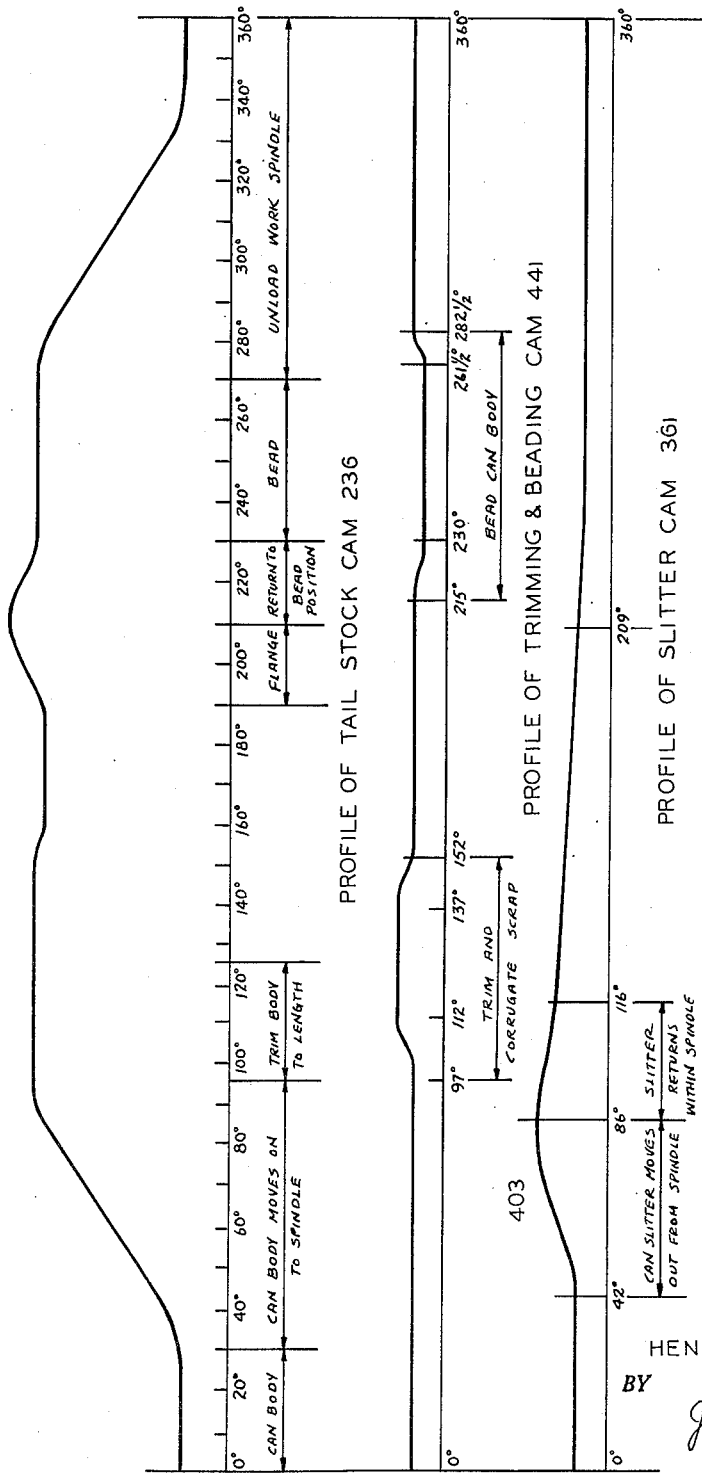

United States Patent Office 3,033,264
Patented May 8, 1962

3,033,264
APPARATUS AND METHOD USED IN
MAKING A CAN BODY
Henry G. Henrickson, Mount Prospect, Ill., assignor to
Kaiser Aluminum & Chemical Corporation, Oakland,
Calif., a corporation of Delaware
Filed Mar. 2, 1960, Ser. No. 12,446
27 Claims. (Cl. 153—2)

This invention relates generally to apparatus and a method for completing the fabrication of a container or can body which has been previously partially formed. More particularly, it is concerned with improvements in apparatus and a method for completing the operations of trimming a can body to length, beading the wall thereof, and forming a flange at one end of the body.

It is a purpose of this invention to provide an improved apparatus and a method for trimming, beading and flanging can bodies such as for example, can bodies formed during a drawing process and wherein a can body has a side wall and end closure all formed integrally with each other from a single metal blank.

Other purposes and objects of the present invention will become apparent from the specification following taken with the drawings which together describe and illustrate a preferred apparatus and method for carrying out the invention herein, and what is now considered to be the best mode of practicing the principles thereof. Other embodiments of the invention may be suggested to those having the benefit of the teachings herein and such other embodiments are intended to be reserved especially as they fall within the scope of the subjoined claims.

In the drawings:

FIG. 8 is a schematic elevational view showing details of driving mechanism for the work spindles seen in FIGS. 1 and 2, said view looking in the direction of the arrows 8—8 of FIG. 1;

FIG. 9 is a section taken along either line 9—9 of FIG. 8, looking in the direction of the arrows, showing details of driving mechanism for the work spindles;

FIG. 10 is a section taken along the line 10—10 of FIG. 8, looking in the direction of the arrows, and showing details of a main drive shaft and pulley for the work spindles;

FIG. 11 is a section taken along either line 11—11 of FIG. 8, looking in the direction of the arrows and showing further details of the driving mechanism for the work spindles;

FIG. 12 is a section taken along the line 12—12 of FIG. 8 looking in the direction of the arrows and showing details of a belt take up pulley for the spindle driving mechanism seen in FIG. 8;

FIG. 13 is a section taken along the line 13—13 of FIG. 8 looking in the direction of the arrows and showing further details of a belt take up pulley for the spindle driving mechanism seen in FIG. 8;

FIG. 14 is an elevational view, parts being shown in longitudinal section, of a head stock turret and the work spindles turning thereon, said view looking in the direction of the arrows 14—14 of FIGS. 1 and 2;

FIG. 15 is a detailed longitudinal section taken through a work spindle seen in FIG. 14, said view being to a larger scale than seen in FIG. 14;

FIG. 16 is a transverse section taken through the work spindle seen in FIG. 15, said view looking in the direction of the arrows 16—16 of FIG. 15;

FIG. 21 is a longitudinal sectional view taken along the line 21—21 of FIG. 2 looking in the direction of the arrows, showing details of mechanism for advancing a partly completed can body on to a work spindle seen in FIG. 14, and for removing the same therefrom at the completion of the operations on the can body;

FIG. 22 is an elevational view looking in the direction of the arrows 22—22 of FIGS. 1, 2 and 14, showing details of beading and trimming rollers for the can bodies supported on the work spindles seen in FIG. 14;

FIG. 23 is a section taken along the line 23—23 of FIG. 22 looking in the direction of the arrows, showing details of the rollers for performing the beading operations on a can body;

FIG. 24 is a section taken along the line 24—24 of FIG. 22 looking in the direction of the arrows, showing details of a scrap corrugating roller and a can trimming rotary knife for the can bodies;

FIG. 28 is an elevational view looking in the direction of the arrows 28—28 of FIG. 2, showing details of a cam for operating the cam follower seen in FIGS. 25 and 27 and the slitter knife seen in FIGS. 14 to 20;

FIG. 29 is an elevational view looking in the direction of the arrows 29—29 of FIGS. 1 and 2, showing details of a cam for providing the movement of the mechanism seen in FIGS. 22 to 24 inclusive;

FIG. 30 is an elevational view of a cam mechanism supported on the tail stock seen in FIG. 7 for providing the movement of the mechanism seen in FIG. 7; and FIG. 31 is a development of the profiles of the various cams seen in FIGS. 28, 29 and 30.

General Description of Machine

Figure 1:
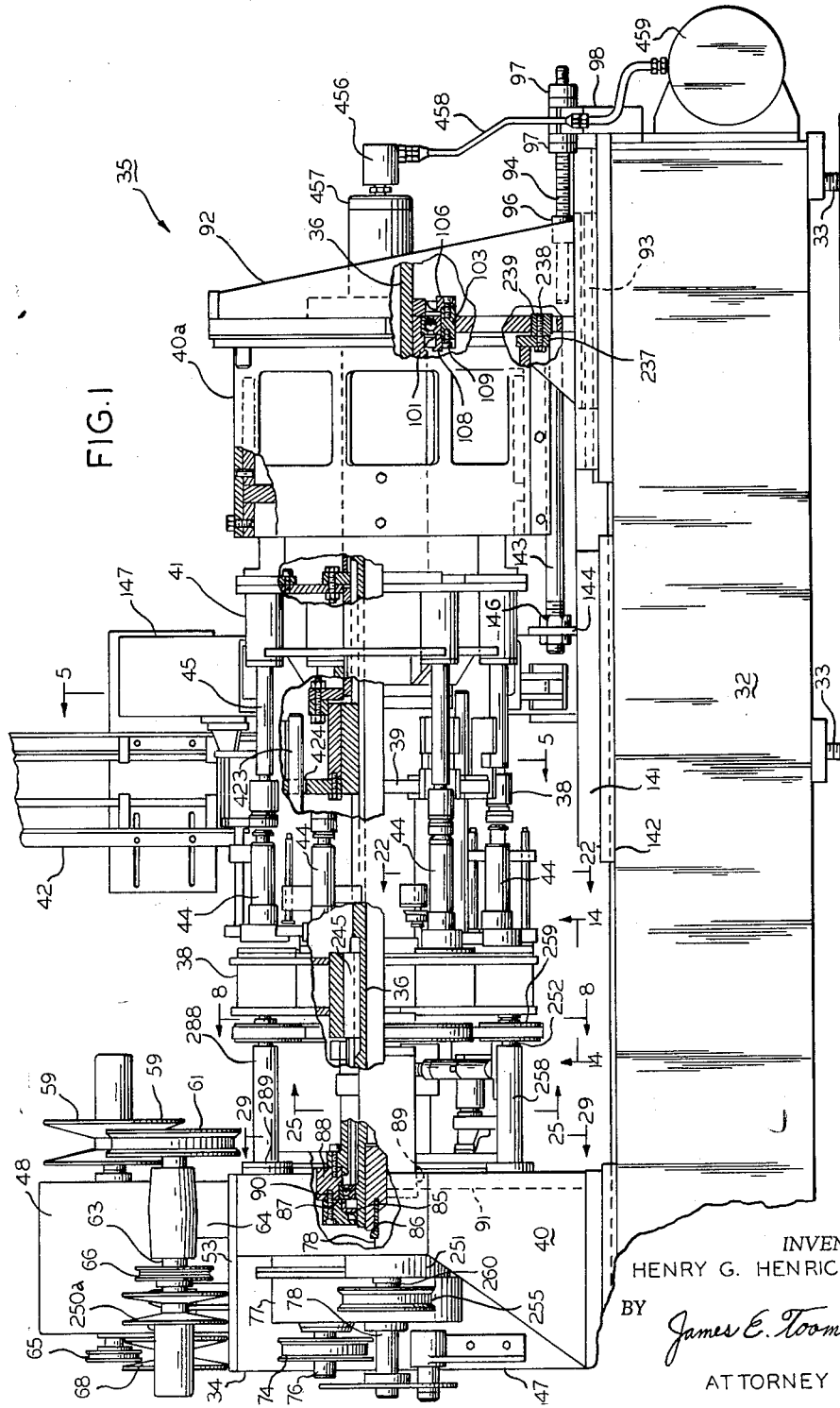
FIG. 1 is a front elevational view with parts broken away and shown in section of a can body beading, trimming and flanging apparatus or machine embodying the improvements according to the present invention.
Figure 2:
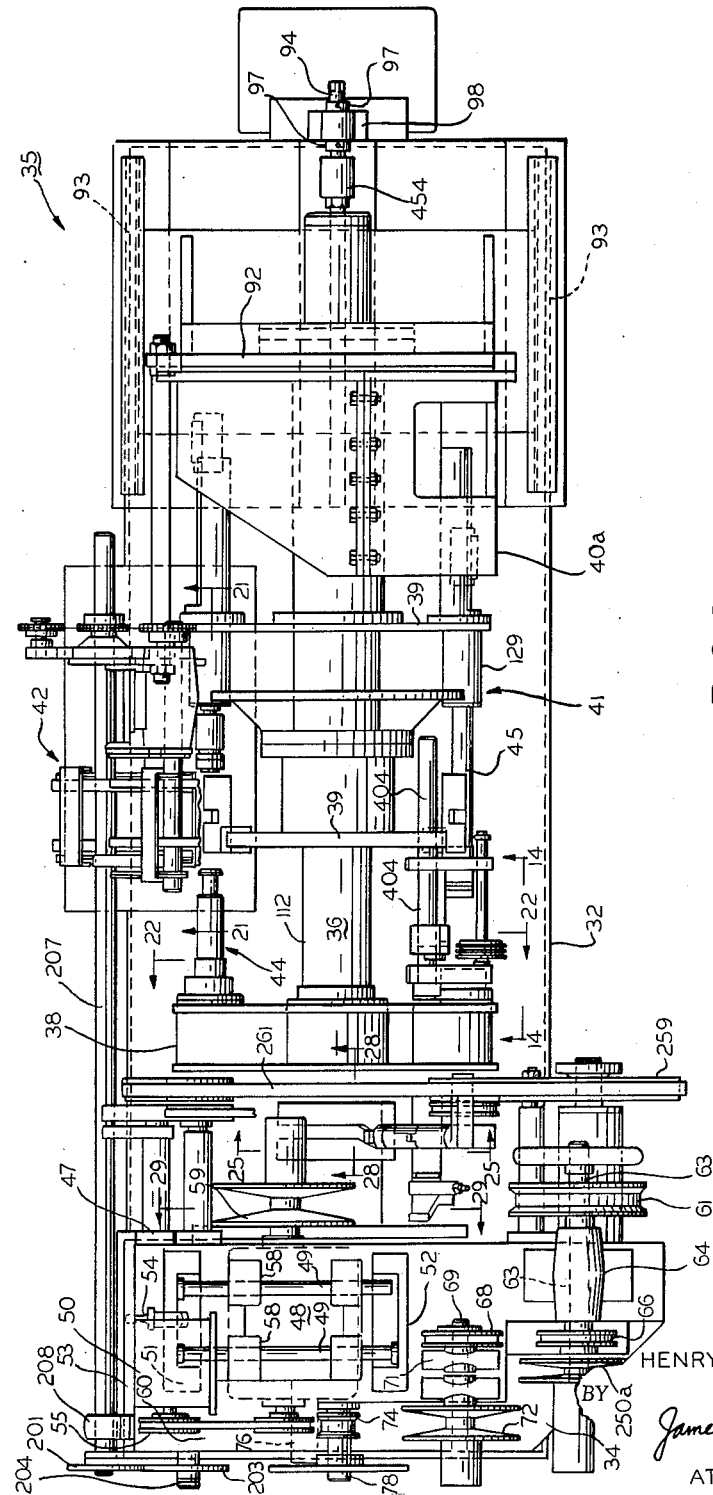
FIG. 2 is a plan view thereof.

Referring now to FIGS. 1 to 7 of the drawings, the trimming, flanging and beading machine according to the present invention is referred to generally by the reference numeral 35, and as seen particularly in FIGS. 1 and 2, such machine includes a base 32 having feet 33 for adjusting the position thereof. The base 32 supports a driving unit 34 for a head stock 40 which is spaced from a tail stock 40a, the head stock 40 and the tail stock 40a having a main drive shaft 36 supported therebetween. Main drive shaft 36 is in the form of a long quill driving a head stock turret 38 supported at the head stock 40, a central transfer wheel 39, and a tail stock turret 41 supported at the tail stock 40a.

Figure 4:
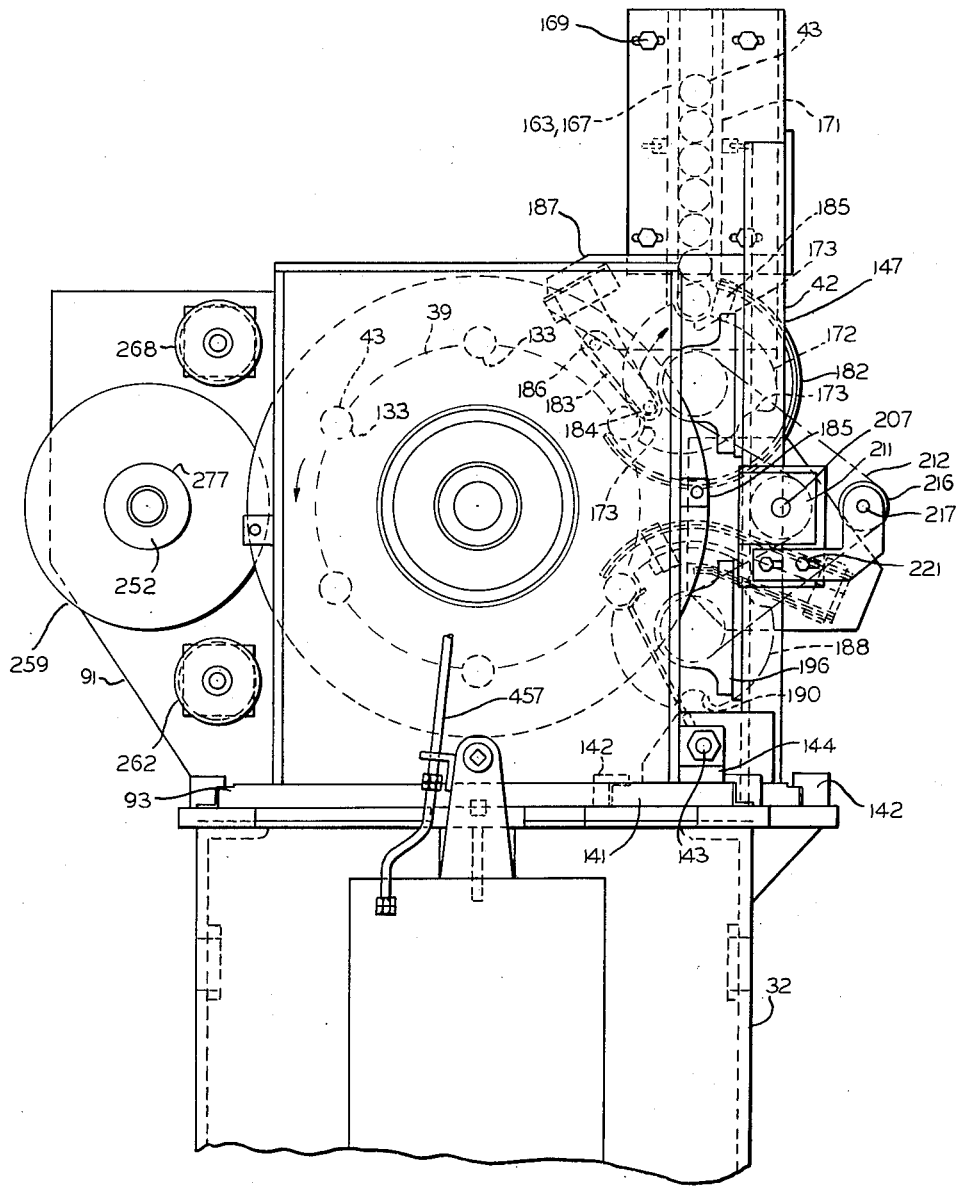
FIG. 4 is an end view looking from the right to the left of the apparatus seen in FIGS. 1 and 2.
Figure 7:
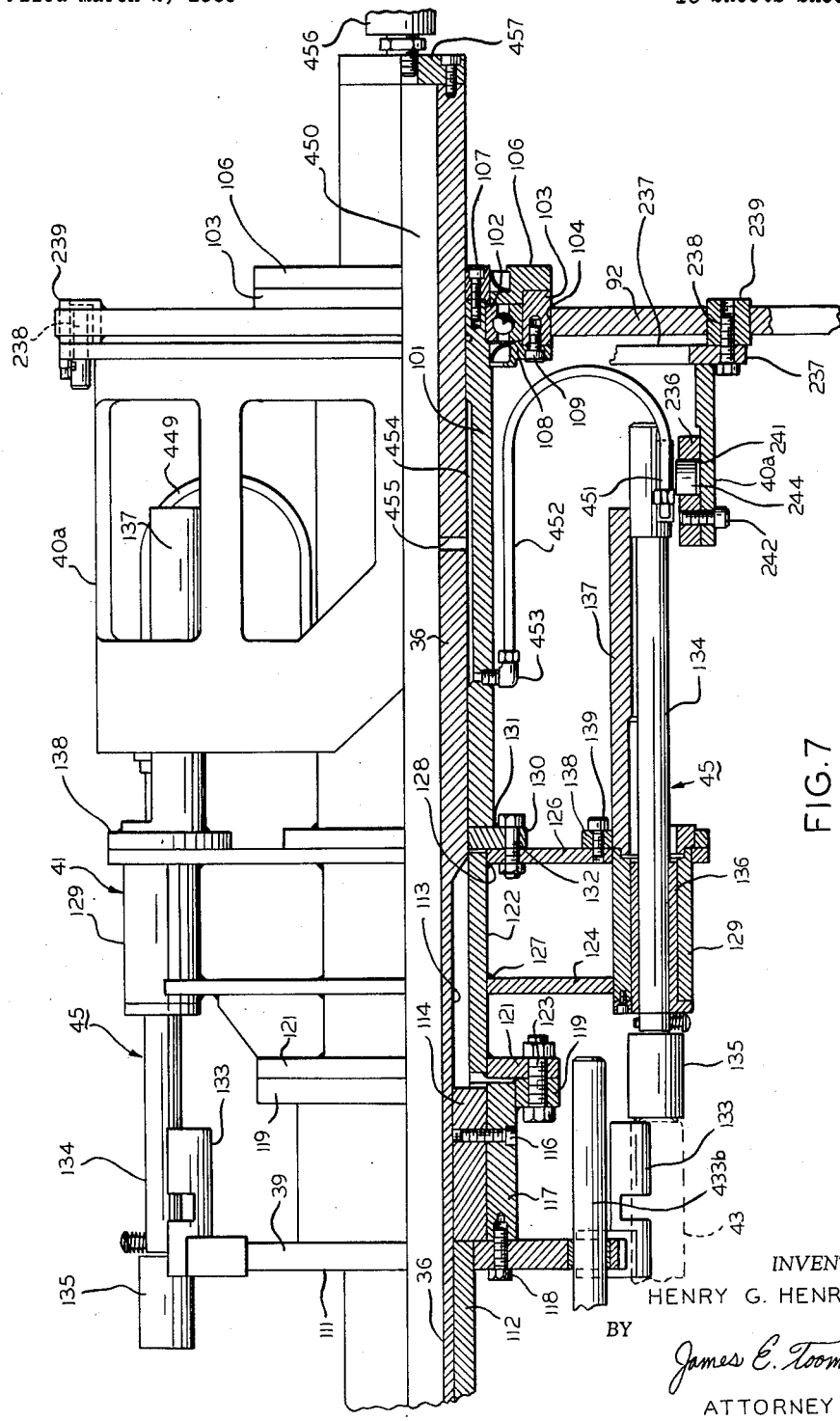
FIG. 7 is a detailed elevational view of apparatus for moving a partly completed can body from the transfer wheel seen in FIGS. 5 and 6 to a work spindle seen in FIGS. 1 and 2, where the operations of trimming, beading and flanging are performed on the can body to complete the same.

A magazine 42 is disposed at the rear of the machine seen in FIGS. 1 and 2 at the central transfer wheel 39, and is adapted to feed partly completed can bodies 43 to the central transfer wheel 39, such partly completed can bodies being shown in FIGS. 4 and 7. The can bodies 43 fed to the central transfer wheel 39 are moved therefrom by longitudinal movement of the can body transfer members or pusher mandrels 45 extending from the tail stock turret 41 and turning therewith. The partly completed can bodies 43 are each moved from the transfer wheel 39 and on to a rotating work spindle 44 extending from the head stock turret 38.

Figure 6:
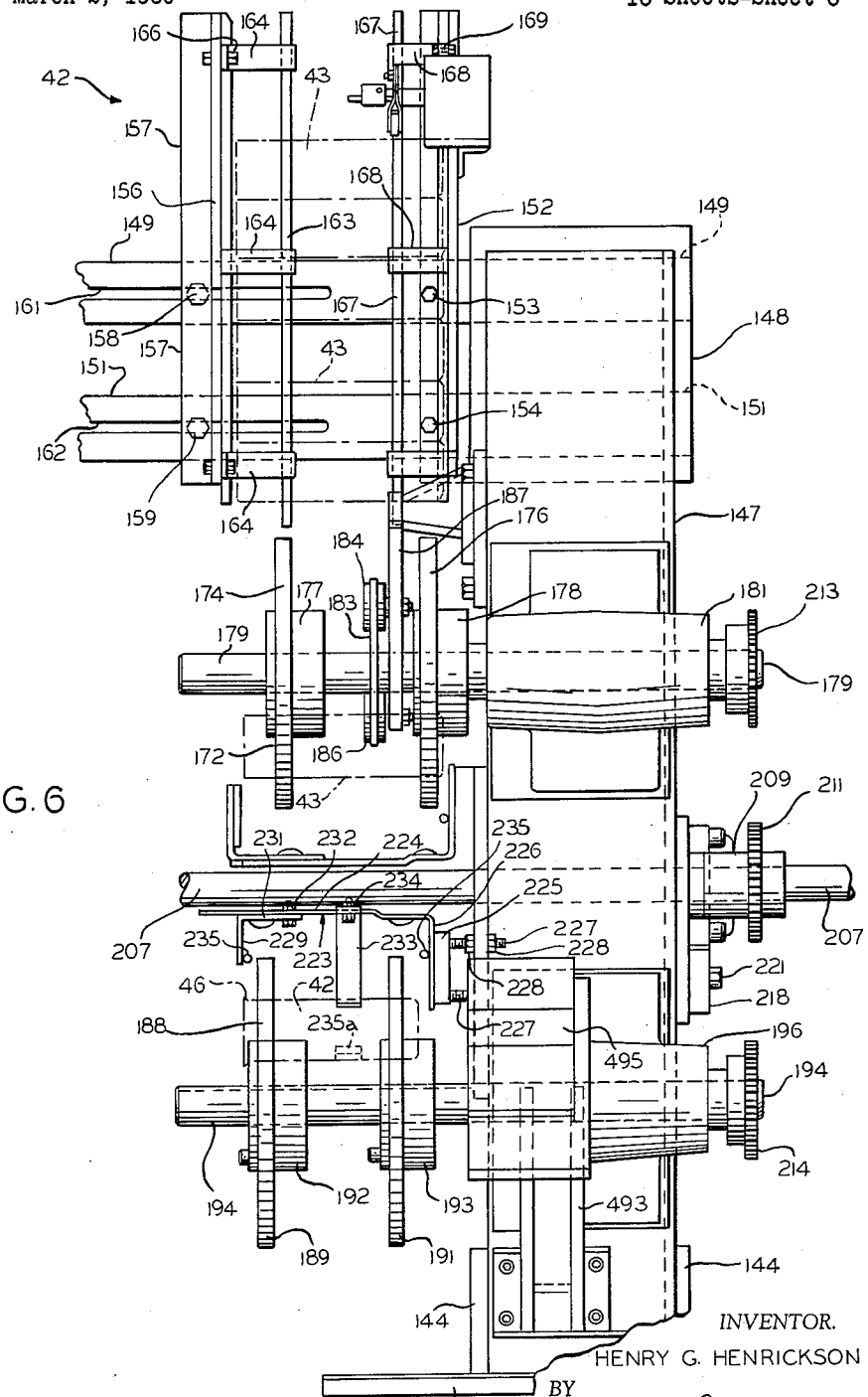
FIG. 6 is a front elevaitonal view looking in the direction of the arrows 6—6 of FIG. 5.

All of the operations of trimming the partly completed can bodies 43 to proper length, removing the trim scrap therefrom, placing a flange 46 on the can body as seen in FIG. 6, beading the can body to stiffen same, if desired, are done on the same spindle 44, once the body 43 has been placed thereon, and there is no transfer of the can body 43 between spindles for completion of the operations thereon.

The initiation and completion of the operations of slitting, trimming, flanging and beading on the same spindle constitute an important feature of the invention.

Figure 3:
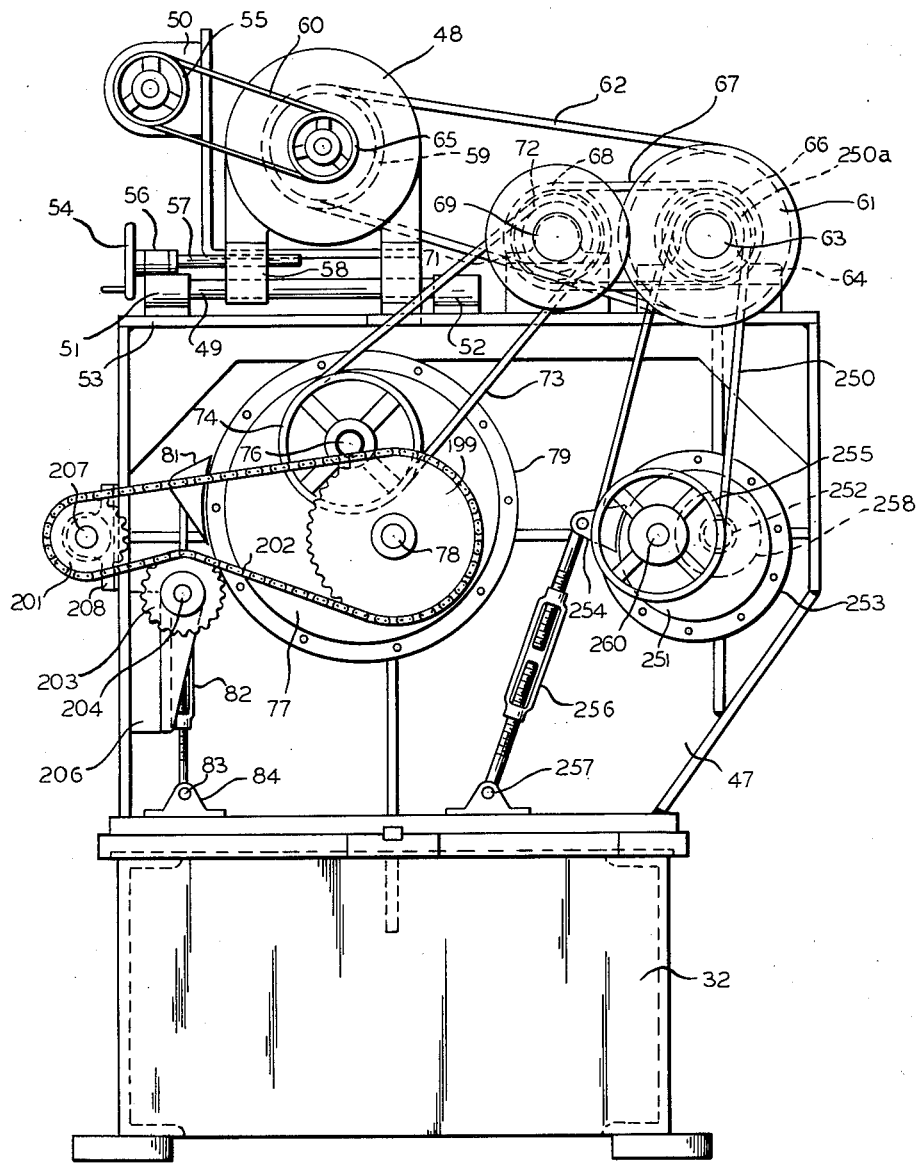
FIG. 3 is an end view looking from the left to the right of the apparatus seen in FIGS. 1 and 2, showing details of the driving mechanism for the apparatus.

Description of Drive for Head Stock Turret, Tail Stock Turret and Central Transfer Wheel Referring now particularly to FIGS. 1, 2 and 3 of the drawings, the driving unit 34 for the head stock turret 38, the tail stock turret 41 and the central transfer wheel 39 includes a frame 47 mounted upon the base 32. The frame 47 supports a main driving motor 48 arranged to move on rails 49 supported at each end on spaced abutments 51 and 52, the abutments 51 and 52 resting upon a top member 53 of the frame 47. The motor 48 can be adjusted in its position by means of a hand wheel 54 turning in fixed bearing 56 resting on the abutment 51, hand wheel 54 being integral with a screw 57 cooperating with a nut 58 forming part of a mount for motor 48 and sliding upon the rails 49.

The speed of motor 48 is controlled by a centrifugal switch 50 having a pulley 55 driven by a belt 60 reeved about a pulley 65 on motor 48, excessive speed of motor 48 causing the switch 50 to open.

Motor 48 turns a pulley 59, which in turn drives a pulley 61 through the medium of an endless belt 62 trained therebetween. Pulley 61 is fast on a shaft 63 supported in a bearing block 64 secured to the top frame member 53. The shaft 63 and the pulley 61 fast thereto afford a central driving point for all of the drive mechanism for the apparatus according to the invention, and the shaft 63 has a belt sprocket 66 fast thereon which drives a timing belt 67 trained about a belt sprocket 68 fast on a counter shaft 69 journalled in a bearing support 71. The shaft 69 also is fast with a belt sprocket 72 cooperating with a timing belt 73 trained about a driven sprocket 74 fast upon an input shaft 76 of a speed reducer main drive 77, the drive 77 having an output shaft 78.

Proper tension can be maintained upon the belt 73 by rotating a housing 79 for the speed reducer main drive 77 about the output shaft 78, the housing 79 having an ear 81 extending therefrom which cooperates with a turn-buckle 82 anchored at 83 to an abutment 84 on the main support 32, see particularly FIG. 3. Adjustment of turn-buckle 82 will rock the housing 79 about the output shaft 78, the tension in the timing belt 73 thereby being adjusted.

The output shaft 78 from the speed reducer main drive 77 is connected to the main drive shaft 36 by means of a key 86, see FIG. 1. The shaft 36 turns in a bearing 87 held in a support 88 extending through an opening 89 in a vertical face plate 91 of the head stock 40. Bearing 87 is enclosed by a shaft seal 85 held to the support 88 by cap screws 90.

The opposite end of the drive shaft 36 is supported in the tail stock 40a, see also FIG. 7, which includes a standard 92 supported upon spaced guideways 93 resting on the base 32, see also FIG. 1. Minor adjustments of the spacing of the tail stock 40a with respect to the head stock 40 can be made by an adjusting screw 94 threaded into a block 96 in the base of the standard 92 and turning in an abutment 98 at one end of the base 32, the position of the standard 92 being maintained by locking nuts 97 threaded to the screw 94 and bearing against the abutment 98, see again FIG. 1.

As seen in FIG. 7, the quill shaft 36 is supported at the tail stock standard 92, and is encircled by a hollow shaft 101 turning with the shaft 36 in a bearing 102 supported in an annular ring 103 positioned in an opening 104 in the tail stock standard 92. A sealing ring 106 is held to the shaft 101 by means of a counter sunk screw 107, and the bearing 102 is also sealed on the other side thereof by means of a seal 108 held to the annular support 103 by cap screws 109.

The central transfer wheel 39 and the tail stock turret 41, see again FIG. 7, are all arranged to turn with the shaft 36, the central transfer wheel 39 consisting of a plate 111 supported upon a cylindrical spacer 112 supported on the quill shaft 36 which spaces the central transfer wheel 39 from the head stock turret 38, see also FIG. 2. The quill shaft 36 has a keyway 113 therein retaining a key 114 locking a hub flange 117 extending from the plate 111 to the shaft 36. A socket head screw 116 extends radially in the hub flange 117 and is tapped into the key 114 to maintain the key 114 in position in the keyway 113. The circular plate 111 is held to the hub flange 117 by means of cap screws 118 tapped into hub 117.

The hub 117 of the central transfer wheel 39 is welded to a circular flange 119 which engages a flange 121 welded to the inner end of a hub 122 for the tail stock turret 41, the two flanges 119 and 121 being held together by bolts 123. The tail stock turret 41 comprises a pair of annular plates 124 and 126, which are spaced along the hub 122, the two plates 124 and 126 being welded respectively at 127 and 128 to the hub 122. The annular plates 124 and 126 support equiangularly spaced bearing sleeves 129 at the periphery thereof, each sleeve 129 guiding a pusher mandrel 45.

In the embodiment herein shown, the tail stock turret has six pusher mandrels, but it is within the scope of the invention to provide a turret having more or less pusher mandrels thereon for placing a can body on a work spindle and in such an event the transfer wheel 39 and the head stock turret 38 would be revised accordingly.

Referring still to FIG. 7, the hollow shaft 101 surrounding the quill shaft 36 and journalled at the bearing 102 in the tail stock standard 92 is held to the annular plate 126 by means of a flange 130 welded at 131 to the inner end of the hollow shaft 101, the flange 130 being held to the plate 126 by bolts 132.

The central transfer wheel 39 supports equiangularly spaced pockets 133 at the periphery thereof, each pocket 133 being essentially semi-circular in cross section and being adapted to receive the can body 43 shown in dotted outline. The pockets 133 are made from fiber material so as not to scratch or otherwise mar the surface of the can 43. The number of pockets is equal to the number of pusher mandrels 45, and each pocket 133 is aligned with a pusher mandrel 45.

The individual can body 43 is moved from the can receiving pocket 133, see FIG 7, by means of the pusher mandrel 45 which includes a longitudinal member 134 guided in a bushing 136 supported within the sleeve 129 of the tail stock turret 41, the members 134 being additionally guided at times in half sleeves 137 having a flange 138 held to the annular plate 126 as by cap screws 139. Each pusher mandrel 134 has a can engaging end member 135 which is freely rotatable upon the member 134 and thus adapted to rotate with the can as it is mounted on the rotating work spindle 44.

As will be described, structure is provided for removing individual partly completed can bodies 43 from the magazine 42 and placing the individual can body 43 in the several pockets 133 disposed on the central transfer wheel 39. Such structure includes mechanism for effecting the transfer of an individual can body 43 from the magazine 42 and for removing a can body which has had the operations of trimming, flanging and beading completed thereon.

*Details of Feed Mechanism*

Referring now to FIGS. 1, 4, 5 and 6 of the drawings, the magazine 42 includes a base 141 which is guided between gibs 142 secured to the top of the main frame 32. The magazine 42 is maintained in proper spaced relationship with respect to the tail stock standard 92 by means of a rod 143, see FIG. 1, secured at one end to the tail stock standard 92 and to an abutment 144, see also FIG. 5, extending upward from the base 141, the adjustment of the magazine 42 with respect to the rod 143 and the tailstock standard 92 being achieved by lock nuts 146 threaded to the end of the rod 143 and flanking the abutment 144.

The magazine 42 consists also of a standard 147 having a channel shaped cross section and extending upward from the base 141, see particularly FIG. 4. The standard 147 has a plate 148 welded to the edges of the flanges of the standard 147, see particularly FIGS. 5 and 6, and a pair of support arms 149 and 151 are welded to the support plate 148 to support end guides 152 and 156 for the can bodies 43. End guide 152 has a cross section in the form of an angle, and cap screws 153 and 154 extend through a base of the angle and are threaded into the support arms 149 and 151 to hold the end guide 152 in place.

End guide 156 also has an angle shaped cross section, and is adjusted in position on the arms 149 and 151. Guide 156 has a base 157 bearing against arms 149 and 151, and bolts 158 and 159 extend through slots 161 and 162 to hold the guide 156 in position.

The movable end guide 156 also supports a front guide rod 163 for the can bodies 43, see particularly FIG. 6, the guide rod 163 being supported on brackets 164 which are adjusted in position with respect to the guide 156 by bolts 166, according to the diameter of the can body 43. The fixed end guide 152 likewise supports a guide rod 167 which is secured to brackets 168 adjustably held to the guide 152 by bolts 169.

As seen in FIG. 4, the can bodies 43 are also guided by similar adjustable guides referred to generally by the reference numeral 171, these being adjusted in position with respect to the guides 152 and 156 according to the diameter of the can body 43.

*Details of Can Feeding and Delivery Mechanism*

The guides 152 and 156 and the forward guides 163 and 167 and the rear guides 171 define a vertical chute for the movement of the can body 43 to can feeding mechanism as will now be described. The bottommost can body is adapted to be removed from the magazine 42 by a can feeding wheel 172, having equiangularly spaced pockets 173 therein to receive a can body 43. As seen in FIGS. 4 and 6, the feeding wheel 172 rotates in a clockwise direction, and includes a pair of spaced discs 174 and 176, each having the aforesaid pockets 173 therein, which are aligned with each other. The discs 174 and 176 have hubs 177 and 178 respectively which are fast on a drive shaft 179 supported in a pillow block 181 mounted on the frame member 147, see also FIG. 5.

Figure 5:
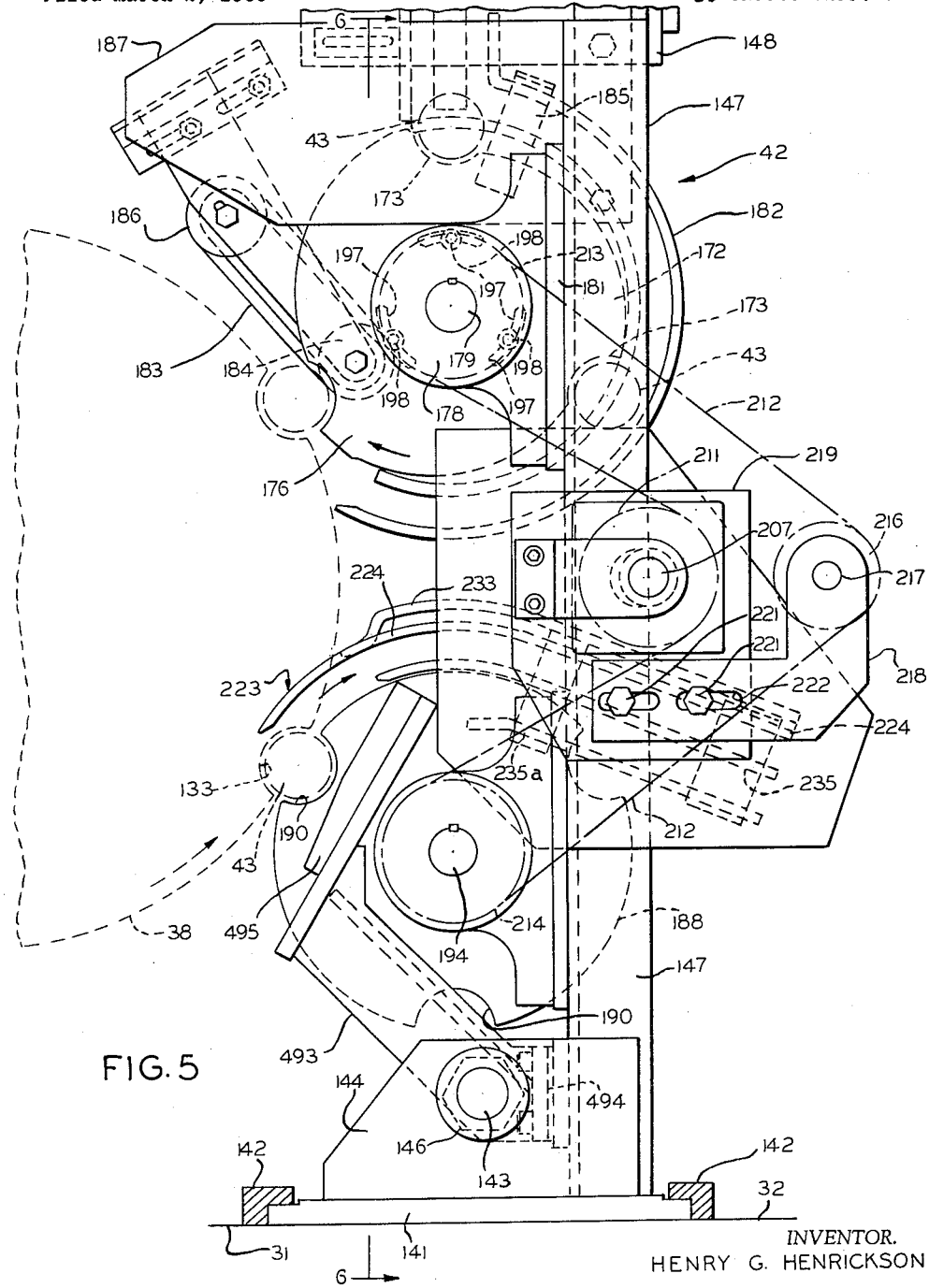
FIG. 5 is an end elevational view of apparatus for transferring a partly completed body from a feed magazine to a transfer wheel, removing the completed can body from the transfer wheel and on to a delivery chute, said view being taken substantially along the lines 5—5 of FIG. 1, and looking in the direction of the arrows.

As the can body 43 is picked up at a pocket 173 of the can feeding wheel 172, it is guided between the can feeding wheel 172 and a circular chute 182 spaced from the periphery of the can feeding wheel 172, as seen in FIG. 5. Circular chute 182 has lugs 185 for mounting the same to the standard 147.

As the can feeding wheel 172 moves in a clockwise direction, it will transfer a can body 43 from the pocket 173 to the pocket 133 of the central transfer wheel 39, see also FIGS. 1, 2 and 7, the central transfer wheel 39 being indicated in dotted outline in FIG. 4.

Structure is provided for stripping the can body 43 from the can feeding wheel 172 on to the central transfer wheel 39 when a pocket 173 of the can feeding wheel 172 is indexed with a pocket 133 of the central transfer wheel 39. Such structure includes, see also FIGS. 5 and 6, an idler belt 183 reeved between a pair of idler pulleys 184 and 186 supported upon an extension 187 from the standard 147, see also FIG. 4. The idler belt 183 merely contacts the periphery of the can body 43 to insure that it leaves the pocket 173 of the can feeding wheel 172 and is transferred to the pocket 133 of the central transfer wheel 39.

As will be described in more detail as this specification proceeds, the individual can bodies 43 which have been transferred from the can feeding wheel 172 to the central transfer wheel 39 will be removed from central transfer wheel 39 by the pusher mandrels 45 seen particularly in FIG. 7, and inserted on a work spindle 44 of the head stock turret 38 seen particularly in FIG. 14, the can body 43 being completely processed on such work spindle. The completed can body is removed from such spindle by the pusher mandrels 45 seen in FIG. 7, and placed once more upon the central transfer wheel 39, the trimmed, flanged and beaded (if desired) can body 43 then being transferred from such central transfer wheel 39 to a delivery wheel 188, see again FIGS. 4, 5 and 6, having equiangularly spaced pockets 190 therein.

As with the can feeding wheel 172, the delivery wheel 188 includes a pair of discs 189 and 191 respectively mounted on hubs 192 and 193 fast upon a shaft 194 turning in a pillow block 196 secured to the channel shaped standards 147.

It may be noted that both the loading wheel 172 and delivery wheel 188 are arranged to be adjusted with respect to the hubs upon which they are supported, so that the wheels 172 and 188 can be properly indexed with respect to the central transfer wheel 39. To this end, and referring particularly to disc 176 which is typical of the discs 174, 176, 189 and 191, such disc includes a plurality of arcuate slots 197 equiangularly disposed thereon which slots cooperate with cap screws 198 tapped into the hub 178 upon which the same is mounted.

It may be noted that the central transfer wheel 39 is arranged with six pockets 133 therein, while the wheels 172 and 188 each have three pockets therein. The diameter of the central transfer wheel 39 is twice the diameter of the transfer wheels 172 and 188, and in order to provide transfer between the wheels 172 and 188 and the central transfer wheel 39, wheels 172 and 188 must turn at an angular speed which is twice the angular speed of the central transfer wheel 39. Referring again to FIG. 3 of the drawings, the main output shaft 78 from the speed reducer main drive 77 has a sprocket 199 thereon which drives a sprocket 201 by means of a sprocket chain 202 being trained therebetween. An idler slack take-up sprocket 203 is provided between sprockets 199 and 201 and turns freely on an idler shaft 204 mounted on the adjustable support 206 adjustably secured in any convenient fashion to the head stock frame 47.

Sprocket 201 is fast upon a shaft 207, see again FIG. 3, journalled in a pillow block 208 secured on the back of the frame 47, and the shaft 207 is journalled adjacent the magazine 42 in a bearing 209, see FIG. 6. A sprocket 211 is fast on the shaft 207 and meshes with an endless sprocket chain 212 reeved about a pulley 213 fast on the shaft 179 turning the can feeding wheel 172, and about a pulley 214 fast on the shaft 184 turning the delivery wheel 188. An idler sprocket 216 is mounted on an idler shaft 217 supported in a bracket 218 which is adjusted in position with respect to a base plate 219 welded or otherwise secured to the standard 147, cap screws 221 and slots 222 in the bracket 218 being provided for adjusting the position of the idler sprocket 216 so as to take up the slack in the chain 212, see FIG. 5.

The completed can body 43 which has been transferred from the central transfer wheel 39 to the delivery wheel 188 is moved thereby to a delivery chute 223 seen in FIGS. 5 and 6. Delivery chute 223 includes a guide 224 spaced from the delivery wheel 188, guide 224 having an arcuate flange 226 held to a block 225 on the standard 147, by means of bolts 227 and nuts 228. The width of the chute 223 is adjusted by an angle shaped member 229 having a leg 231 which is adjusted in position with respect to the guide 224 by means of bolts 232. The chute 223 also has a central guiding finger 233 held by a mounting bolt 234 to the guide 224, the finger 233 also having a curved configuration generally corresponding to the guide 224. Each of the side walls of the delivery chute 223 include curved guide fingers 235 which guide the ends of the finished can body 43, see particularly FIG. 6. A finger 235a extending between the disks 189 and 191 serves to strip the body 43 from the pocket 190.

*Details of Can Body Transfer Mechanism*

As has previously been described, the work spindle 44 on the head stock turret 38 and the pusher rods or mandrels 45 on tail stock turret 41 revolve with the central transfer wheel 39 on the quill shaft 36. The central transfer wheel 39 is arranged to hold a can body in the pocket 133 thereon, and the pusher mandrel 45 of the tail stock turret 41 is arranged to move the can body 43 from the central transfer wheel 39 to a rotating work spindle 44, the aforesaid feeding operation by the feeding wheel 172 to the central transfer wheel 39 being in continuous fashion, and the pusher mandrel 45 of the tail stock turret 41 effecting a transfer from the pocket 133 of the central transfer wheel 39 to an empty work spindle 44. It should be kept in mind that once a can body 43 has been moved on to the spindle 44 at a loading point, the operations of trimming, flanging and beading of such can body are completed on such spindle while the spindle revolves from a loading point to an unloading point, and that once those operations are completed the pusher mandrels 45 remove the completed can body from the spindle 44 to the central transfer wheel 39. The completed can body is picked up from the central transfer wheel 39 by delivery wheel 188 and removed from the machine at the delievry chute 223.

Structure is provided for moving the can body 43 from the central transfer wheel 39 on to the spindle 44. With particular reference to FIGS. 1, 2, 7, 30 and 31 of the drawings, the structure for moving the pusher mandrel 45 longitudinally of the central transfer wheel 39 includes a barrel shaped cam 236 mounted on the tail stock 40a, see particularly FIGS. 7 and 30. The tail stock 40a, has a circular flange 237 welded thereto, the flange 237 and the tail stock 40a being held to the tail stock standard 92 by means of cap screws 238 tapped into aligning bosses 239 extending from the tail stock standard 92.

The tail stock cam 236 is fixedly held to the interior of the tail stock 40a by means of cap screws 242, and the cam 236 has a groove 241 which guides a cam follower 244 supported at and secured to one end of the member 134 of the pusher mandrel 45, see also FIG. 21. The contour of the groove 244 is best shown with respect to FIGS. 30 and 31, and the movement of the pusher mandrel 45 is in accordance with the profile seen in FIG. 31, as will be described.

*Description of Head Stock Turret and Spindle Driving Mechanism*

The head stock turret 38 supporting the work spindle 44, see FIGS. 1, 2 and 14, comprises a hub 245 which is keyed to the main drive quill shaft 36 by means of a key 246. A pair of circular plates 247 and 248 are spaced along the hub 245 and are welded thereto as shown, the circular plates 247 and 248 supporting equiangularly spaced sleeves 249 in which spindles 44 are journalled, each such spindle being aligned with a pocket 133 on the central transfer wheel 39 and a mandrel 45 of the tail stock turret 41.

Structure is provided for driving the work spindles 44 seen in FIG. 14 rotatably while they revolve with the head stock turret 38 seen in FIGS. 1 and 14, each such rotating work spindle 44 cooperating with cams and cam operated tools which perform the operation of trimming, flanging and beading a can body 43 while it is on the spindle 44, which cams and tools will be described in further detail as this specification proceeds. Referring now to FIGS. 1, 3 and 8 to 13 inclusive, the structuer for driving the work spindle 44 includes a pulley 250a, see particularly FIG. 3, having a belt 250 trained therearound which drives a pulley 255 fast on an input shaft 260 of a speed reducing mechanism 251 having an output shaft 252. The speed reducer 251 includes a housing 253 supported on the vertical face plate 91 and rotatable about the output shaft 252, and the tension in the belt 250 can be adjusted by means of an ear 254 extending from the housing 253 and connected to a turn buckle 256 having an abutment at 257 to the base 32.

The output shaft 252 from the speed reducer 251 is housed within a sleeve 258, see also FIGS. 1, 8 and 10, and the shaft 252 has a pulley 259 fast thereon driving an endless belt 261 shown schematically in FIG. 8. Endless belt 261 is for the purpose of driving the work spindles 44 indicated generally in FIG. 8.

The endless belt 261 is reeved as seen in FIG. 8, to effect driving of the work spindles 44 seen in FIG. 14. The endless belt 261 is thus reeved, considering the driving pulley 259 as a starting point, about a first idler pulley 262 mounted on the vertical face plate 91, see also FIG. 9, a second idler pulley 263 also being mounted on the face plate 91, see FIG. 11. The endless belt 261 extends from the idler pulley 263 and about an idler pulley 264 and thence seriatim about a series of driving pulleys 266, see FIG. 14, one for each typical work spindle 44. After thus contacting the several driving pulleys 266, the endless belt 261 is reeved about an idler 267, see again FIG. 11, and thence about an idler 268, see FIG. 9, and back to the beginning at the driving pulley 259.

Each of the work spindles 44 moves orbitally with the head stock turret 38 and with the quill shaft 36 as a center, and the spindles are accordingly given rotative motion by the combination of the movement of the endless belt 261 and the orbital movement of the spindles with the quill shaft 36 seen in FIG. 14.

Structure is provided for insuring the provision of driving effort to the pulley 266 for each spindle 44 as it moves out of contact with the endless belt 261 adjacent the point where it is reeved about the idler pulley 267 and where the spindle 44 moves again into contact with the endless belt 261 adjacent the idler 264. Such structure comprises an endless belt 269 which is reeved about a pulley 271 turning on a common center with the pulley 263, see also FIG. 11, and about a pulley 272 also turning on a center common to the pulley 267, see again FIG. 11, and thence about an idler 273, see FIG. 12, the endless belt 269 having a reach contacting a pulley 274 which is integral with the pulley 266 for driving the spindle 44, see again FIG. 14, and receiving its driving effort from same.

It will thus be seen that the driving effort is maintained for the spindle 44 between the points where the driving pulley 266 therefor moves out of contact with the endless belt 261 and before it re-establishes contact with the endless belt 261.

Referring now to FIG. 10 of the drawings, the driving shaft 252 turns in spaced bearings 276 contained within the sleeve 258, the end of the shaft 252 protruding beyond the sleeve 258 having the pulley 259 connected thereto by means of a taper hub 277 and a key 278. Referring now to FIG. 9, the idler pulleys 262 and 268 turn upon bearings 279 supported on a stub shaft 281 maintained in a shaft support 282 having a flange 283 held by cap screws 284 to the face plate 91. The idler pulleys 271, 272, 263 and 267 are mounted upon bearings 286 supported upon a stub shaft 287 held in a shaft support 288 having a flange 289 held by cap screws 291 to the face plate 91.

Structure is provided for enabling the idler pulley 264 about which the driving belt is reeved to be adjusted in position to take up the slack in the driving belt 261. To this end, and as seen in FIG. 13, the idler pulley 264 is mounted on a short stub shaft 292 extending from an arm 293 which is adjusted in position with respect to an arm 294 by means of a pinch bolt 296. The arm 294 extends as seen in FIG. 13 from a standard 297 having a base flange 298 held to the face plate 91 by means of cap screws 299.

Structure is also provided for maintaining the proper tension in the belt 269 which maintains the driving effort on the work spindle 44 when it moves out of contact with one reach of the endless driving belt 261 and into contact with another driving reach thereof. As seen in FIG. 12, the idler pulley 273 is mounted upon a stub shaft 301 extending from a swivel arm 302 which is adjusted in position with respect to an arm 303 and locked with respect thereto by means of a pinch belt 304. As with the support for the idler pulley 264, the arm 303 extends from a standard 306 having a base flange 307 held thereto by means of cap screws 308.

*Details of Work Spindle for Can Body*

The work spindle 44 is adapted to support a can body 43 which has been fed by the magazine 42 to the central transfer wheel 39 and moved therefrom on to the work spindle 44 by means of the pusher mandrel 45 of the tail stock turret 41, and referring now to FIGS. 1, 2, 14, and 15 to 20 of the drawings, the work spindle 44 supporting the can body 43 comprises a quill shaft 309 turning in spaced bearings 311 and 312, see particularly FIG. 14, mounted in the sleeve 249 supported in the head stock plates 247 and 248. The integral driving pulleys 266 and 274 for driving the work spindle 44 are made fast to the quill shaft 309 by means of a tapered bushing 313 and a key 314 held in place by a lock nut 316 threaded to the quill shaft 309.

The quill shaft 309 has a flange 317 extending beyond the circular plate 248 of the head stock turret 38, and the flange 317 supports a flanged bushing 318 held to flange 317 by means of countersunk screws 319. The flanged bushing 318 guides a tool slide rod 321 which is also guided in a bushing 322 supported in the quill shaft 309 adjacent a position where the pulleys 266 and 274 are supported. The flanged bushing 318 also supports a spindle nose member 323 having a flanged base 324 held to the flanged bushing 318 by means of socket head screws 326. As seen with particular reference to FIG. 14, the spindle nose 323 has a base portion of enlarged diameter 327 corresponding to the inner diameter of the can body 43. The base portion 327 has annular grooves 328 therein adapted to cooperate with a can trimming tool as will be described as this specification proceeds. The lands between the grooves are suitably knurled so that the scrap trimmed from can body 43 is properly gripped when the can trimming tool moves against the can body 43.

A trim ring 329 bears against the enlarged diameter portion 327 and a sleeve 331 abuts the trim ring 329, the trim ring 329 and sleeve 331 being held in position on the spindle nose 323 by a spindle nose cap 332 and socket head screws 333 threaded into the end of the spindle nose 323. A flange sizing ring 334 is held to the flange 324 of the spindle nose 323 by means of countersunk screws 336, see also FIG. 15. The flange sizing ring 334 is adjacent a contoured surface 325 on the spindle nose 323 for the purpose of limiting the flare of a flange formed on the can body 43 at the contoured surface or die flanging profile 325.

*Can Body Slitting Mechanism*

Structure is provided in the work spindle 44 for supporting a slitting knife 337 to slit the can body 43 to a desired depth when it is advanced by the mandrel 45 on to a work spindle 44. The knife 337 is given movement radially outward of the spindle for such slitting and a subsequent radial movement inward to slit the can body to a prescribed length.

As seen in FIGS. 14, 15 to 20, 25, 27, 28 and 31, the tool slide rod 321 is arranged to actuate the slitting knife 337 for the above-described movement, and the tool shaft 321 is moved longitudinally by means of a stationary drum cam 361, see FIG. 28, supported on a cylindrical sleeve 362 surrounding the quill shaft 36, a sleeve bushing 363 being interposed between the quill shaft 36 and the sleeve 362. The stationary drum cam 361 is held to the sleeve 362 by means of socket head screws 364 and its position on the sleeve is determined by a liner pin 366. The sleeve 362 has a flange 367 held by socket head screws 368 to the support 88 which is held in the opening 89 in the vertical face plate 91 by the weldments shown. The flange 367 is held in proper position with respect to the vertical face plate 91 by means of a liner pin 373 extending into a recess 374 in the face plate 91, and also by a liner pin 376 extending through the flange 367 and into a recess 377 in the support 88.

Figure 25:
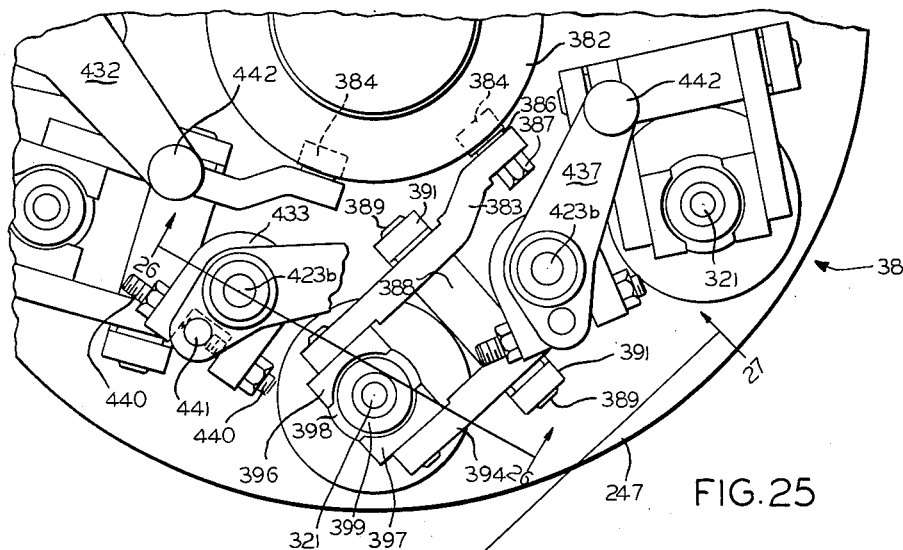
FIG. 25 is an elevational view of cam operated mechanisms mounted on the head stock turret seen in FIG. 14 for controlling the operation of the beading and trimming rollers seen in FIGS. 22 to 24 inclusive, and for controlling the operation of the slitter knife seen in FIGS. 14 to 20 inclusive, said view looking in the direction of the arrows 25—25 of FIGS. 1 and 2.

As seen in FIGS. 14, 25 and 28 particularly, the drum cam 361 has a groove 382 which guides a follower 383 having a cam roller 384 mounted at the end thereof. A pin 386 supporting roller 384 is held to follower 383 by a nut 387, see also FIG. 27. The follower 383 pivots with a hub 388 on a shaft 389 supported at each end in spaced yoke arms 391 extending from a standard 392 which is secured to the circular plate 247 of the head stock turret 38 seen in FIG. 25, by weldments 393.

Follower arm 383 is spaced from an arm 394 which extends from the hub 388, the spaced arms 383 and 394 forming a clevis remote from the cam follower roller 384 and supporting spaced shoes 396 and 397 thereat, the two shoes 396 and 397 embracing the outer race 398 of a bearing 399 supported on a journal 401 which is threaded to the tool shaft 321 and adjustably locked in position thereon by a set screw 402.

Structure is provided for moving the can slitting knife 337, see FIGS. 15 to 20 inclusive, radially outward when the can body 43 is moved by pusher mandrel 45 upon the work spindle 44. The slitter knife 337 is actuated by longitudinal movement of the tool slide rod 321, its longitudinal movement to the right as seen in FIG. 14 being caused by a lobe 403 on the drum cam 361, see FIG. 31. The slitter knife 337 is mounted on a slide 404 and has a base 406 secured to the slide 404 by cap screws 405. The slide 404 cooperates with the tool slide rod 321, the latter having a straight faced cam 407 inclined at a 45° axis to the axis of the tool slide rod 321 and cooperating with a mating slot 408 in the slide 404. The slide 404 is adapted to slide radially with respect to the work spindle 44 in a slot 409 in the enlarged diameter portion 327 of the spindle nose 323 of work spindle 44, see again FIG. 14, and with respect to a sleeve 410 encircling the tool slide rod 321 within the spindle nose 323. The inner end of sleeve 410 is biased to the right as seen in FIG. 14 by a spring 411 encircling the tool slide rod 321, the movement to the right of the sleeve 410 being limited by shoulder 412 formed in the spindle nose 323. The other end of the spring 411 is bottomed against a shoulder 413 at the inner end of the quill shaft 309.

The sleeve 410 is arranged to rotate with the tool slide rod 321 and to move longitudinally with respect thereto, the sleeve having a longitudinal slot 414 therein which cooperates with a pin 415 which is carried by tool slide rod 321 and extending into slot 414 on sleeve 410, see FIGS. 15 and 16.

Figure 19:
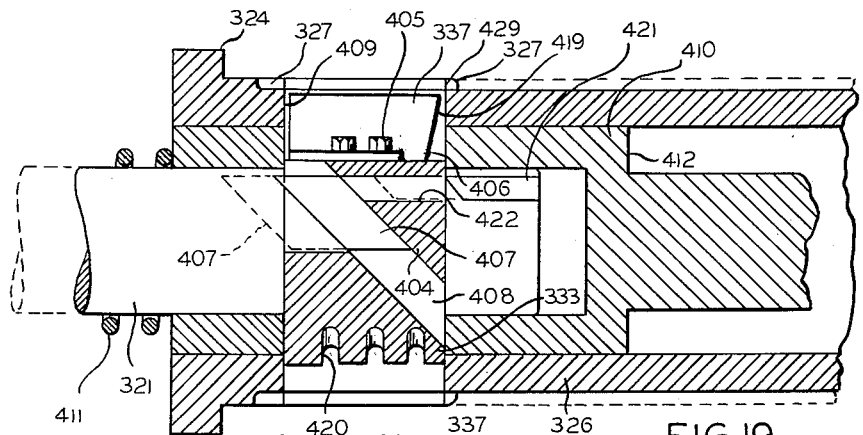
FIG. 19 is a detailed longitudinal sectional view through the work spindle seen in FIG. 14, showing details of mechanism for moving the slitter knife seen in FIGS. 17 and 18 with respect to the work spindle, said view showing the slitter knife in retracted or non-operative position.
Figure 20:
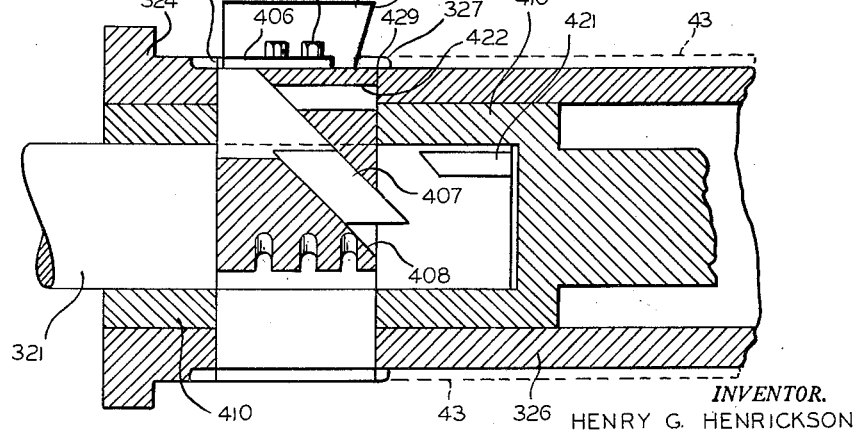
FIG. 20 is a view similar to FIG. 19 but showing the slitter knife in extended or operative position.

The movement of the tool slide rod 321 to the right, as seen in FIG. 14, within the quill shaft 309 causes the slitter knife 337 to move outward radially as seen in FIG. 20, while movement to the left of the tool slide rod 321 causes slitter knife 337 to move inward radially to a position as seen more clearly in FIG. 19. The movement of the slitter knife 337 is caused by the lobe 403 in cam 361, see FIG. 31.

The outward movement of the slitter knife 337 is prior to the movement of the can body 43 on to the spindle nose 323 of the work spindle 44. The can body 43 moves against a spindle nose plunger 416 having a shank 417 guided in the spindle nose 323 and having a connection to the sleeve 410 by a cooperating slot and land 418.

Figure 17:
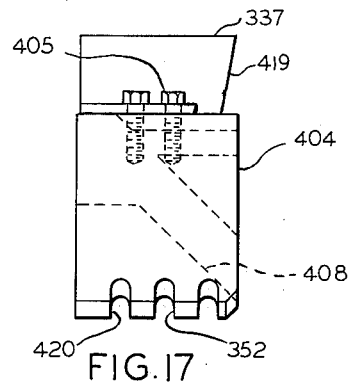
FIG. 17 is a detailed elevational view of a slitter knife supported for movement in the work spindle seen in FIG. 14.
Figure 18:
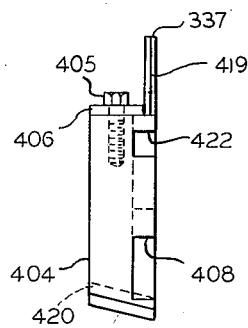
FIG. 18 is an end view thereof.

Upon return movement of the knife 337 into the work spindle 44, the can body 43 is slitted longitudinally to a prescribed length, the knife 337 having an angular knife edge or rake 419 as seen in FIGS. 17, 19 and 20.

The slide 404 has a plurality of annular grooves 420 therein which correspond to the annular grooves 328 in the enlarged diameter portion 327 of spindle nose 323, so that when the slide 404 is retracted, the grooves 352 on the slide 404 correspond to the grooves 328.

The slide rod 321 also has a longitudinally extending gib 421 which cooperates with a slot 422 on the scrap cutter slide 404, so that upon additional movement of the slide rod 321 to the left, the slide 404 will be locked in the retracted position on the slide tool rod 321, as seen in the dotted line position on FIG. 19.

*Description of Trim Scrap Corrugating and Can Beading Mechanism*

Figure 26:
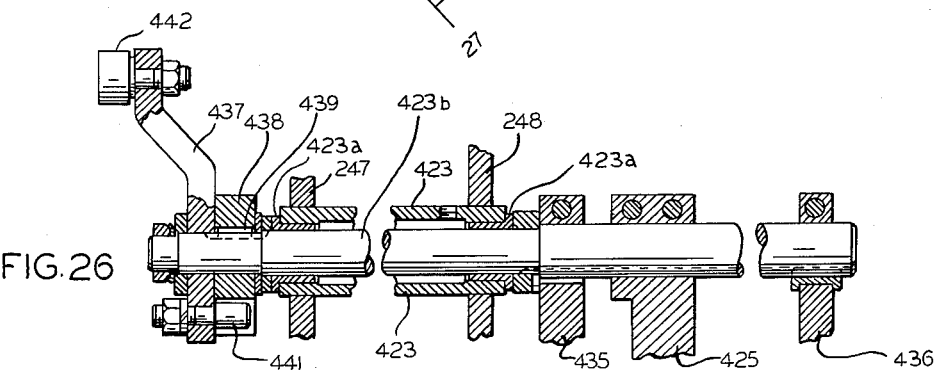
FIG. 26 is a sectional view taken along the line 26—26 of FIG. 25 looking in the direction of the arrows, showing further details of the mechanism operating the trimming and beading rollers seen in FIGS. 23 and 24.
Figure 27:
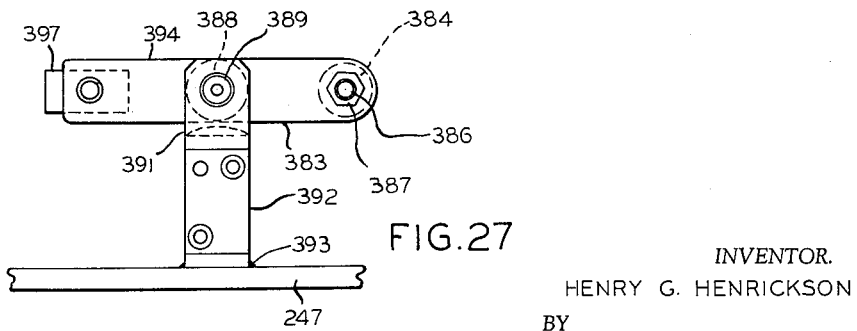
FIG. 27 is an elevational view looking in the direction of the arrows 27—27 of FIG. 25, showing details of mechanism for controlling the movement of the slitter knife seen in FIGS. 14 to 20 inclusive.

Structure is provided for trimming and corrugating the scrap ring located adjacent the open end of the can body while it is mounted on the work spindle 44 after the slitter knife 337 is withdrawn, such cutting and corrugating of the scrap ring being achieved by a trimming and corrugating roller which moves into contact with can body 43 while on the work spindle 44, see FIG. 14. The corrugating of the scrap ring stiffens the same lengthwise so that the scrap is disposed of readily. Referring now to FIGS. 22, 23, 24, 25, 26 and 29 of the drawings, the spaced plates 247 and 248 of the head stock turret 38, see also FIG. 14, support a plurality of sleeves 423 located in close proximity to the sleeves 249 supporting the work spindle 44. As seen in FIG. 26, the sleeves 423 are provided with a bushing 423a at each end thereof to support a rock shaft 423b which is also supported at the end thereof remote from the head stock turret 38 in a bushing 424 supported in the central transfer wheel 39, see also FIGS. 1 and 2. The rock shaft 423b has a trim scrap cutter wheel supporting arm 425 extending therefrom, see also FIGS. 24 and 26, held fast thereto as shown. A trim scrap corrugating wheel 426 having raised lands 426a complementary to the grooves 328 on the spindle nose 323 of the work spindle 44 is mounted on a shaft 427 supported at the end of the arm 425. The shaft 427 also supports a cutter wheel or rotary knife 428 disposed alongside the corrugating wheel 426. The cutter wheel 428 is adapted to enter a complementary groove 429 on the spindle nose 323, see also FIGS. 14, 15 and 20, the rocking of the shaft 423b together with the cutter 428 and the corrugating wheel 426 causing the cutter 428 and the wheel 426 to trim and corrugate a length of scrap the width of which is determined by the slitter knife 337 and the pusher mandrel 45 previously described.

Structure is also provided whereby the shaft 423b supports a beading roller 430 flanked by sleeves 431, the bearding roller 430 and sleeves 431 being supported upon a shaft 432, see FIG. 23, and freely turning in bearings 433 and 434 respectively supported in arms 435 and 426 extending from the rock shaft 423b. The arms 435 and 436 are secured fast upon the shaft 423b in the manner shown in FIG. 23. It may be noted that more than one beading roller 430 may be provided if desired.

Mechanism is provided for rocking the corrugating roller 426 and the knife roller 428 into contact with the can body 43 and for subsequently rocking the beading roller 430 into contact with the can body 43 by rocking the shaft 423b, first in one direction and then in another, such rocking movement being achieved by a cam follower arm 437 mounted on the rock shaft 423b and adjusted in position with respect thereto by means of a collar 438 keyed at 439 to the rock shaft 423b, the collar having adjusting screws 440 engaging a pin 441, see FIG. 25, extending from the follower arm 437. A follower roller 442 is mounted on the end of the follower arm 437 and follows a cam groove 443 of a cam 444 formed in the flange 367 seen in FIGS. 14 and 29.

As seen particularly in FIG. 22, the operation of the cutting roller 428 and the corrugating roller 426 seen in FIGS. 22 to 24 is such as to create a length of corrugated trim scrap, not shown, which is ejected from proximity to the work spindle 44 by means of a chute 445 having a rectangular cross section as seen in FIG. 23. The chute 445 has a stripper finger 446 extending therefrom in proximity to the trimming and corrugating rollers 426 and 428, to guide the corrugated trim scrap, and the chute 445 has a mounting flange 447 see again FIG. 23, for holding the chute 445 to the arm 425 as by screws 448.

*Details of Mechanism for Placing Can Body on Spindle and Removing Same Therefrom*

The details of the mechanism for moving the can body 43 from the central transfer wheel 39 and placing the same on the work spindle 44, moving the can body with respect to the work spindle 44 for the finishing operations thereon, and removing a completed can body which has been trimmed, flanged and beaded (if desired) from the work spindle 44 and replacing same on the central transfer wheel 39 for delivery thereby to the can delivery wheel seen in FIGS. 4 to 6 inclusive, will best be understood with reference to FIGS. 7, 21, 30 and 31 of the drawings.

The pusher mandrel 45 including its longitudinal member 134 guided in the bearing sleeve 129 of the tail stock turret 41 has a central passageway 449 therein which is connected by a radially extending passageway 450 to a fitting 451 in turn connected by a flexible hose 452 and a fitting 453 to an annular passageway 454 formed in the hollow shaft 101 of tail stock turret 41, annular passageway 454 being connected by a radial passageway 455 to the interior of the quill shaft 36. A swivel coupling 456 is connected to an end closure 457 for the quill shaft 36, see again FIG. 7, and the swivel coupling 456 is connected by a line 458 to a vacuum source 459 mounted at one end of the base structure 32, see also FIG. 1. The vacuum source 459 may be any conventional motor operated vacuum pump.

Referring back to FIG. 21, the vacuum in the passageway 449 of the member 134 is also manifested against the bottom of the can body 43, a conical shaped flexible seal 460 located in the can engaging member 135 having the rim 461 thereof contacting the bottom of the can body 43. The seal 460 is held in position centrally thereof against a retaining member 462 by means of a flat head screw 463 tapped in the member 462, screw 463 having an axial passageway 464 in alignment with an axial passageway 466 in the retaining member 462.

The member 462 has a flange 467 adapted to be held by socket head screws 468 to a sleeve 469 rotating freely upon spaced bearings 471 supported upon a hollow extension 472 of a valve body 473 having an extension 474 therefrom adapted to be pressed fitted into a recess 476 in the end of the member 134.

The valve body 473 has a bore 478 therein transverse to the axis of the pusher mandrel 45, and a spool valve member 479 is slidable within the bore 478, it normally being biased to the position shown in FIG. 21 by means of a spring 481 having one end bottomed against the valve body member 473 and its other end bottomed against a button head 482 formed on the end of the spool valve member 479 protruding from the valve body 473. Movement of the spool valve member 479 is limited by means of a C-ring 483 at the other end thereof at times abutting the other side of the valve body 473.

The valve body 473 has passageways 484 and 486 extending longitudinally of the mandrel 45, and communication is normally made through the valve body 473 past a reduced diameter portion 487 in the spool valve member 479, such reduced diameter portion being defined by spaced lands 488.

It will thus be seen that the suction will be manifested at the bottom of the can body 43 since the passageways 466, 484, 486 and 449 will be in communication with each other, and also with the source of vacuum 459 seen in FIG. 1.

Structure is provided for final precision adjustment of the total length of the pusher mandrel 45 to control the movement of the can body 43 thereby, and to this end the member 462 is provided with a collar 489 having an annular flange 491 which clears the periphery of the rim 461 on the flexible seal 460, the collar 489 being locked in position by means of a set screw 492 tapped into the collar 489 and bearing against the member 462.

Normally the spool valve member 479 is in the position seen in FIG. 21 from the time the can body 43 is removed from the central transfer wheel 39 and moved on to the work spindle 44, the end lands 491 of collar 489 being in contact with the bottom of the can body 43. At the conclusion of the operations on the can body 43 the mandrel 45 moves to the right by reason of its cooperation with the groove 241 in the tail stock cam 236 seen in FIG. 7, the suction manifested at the flexible seal 460 being operable to hold the can body to the pusher mandrel 45 and remove same from the work spindle 44.

Structure is provided to actuate the spool valve member 479 to a position to release the suction against the bottom of the can body 43 when it is transferred to the delivery wheel 188 seen in FIGS. 4, 5 and 6. During such time of transfer, and as seen particularly in FIGS. 5 and 6, the valve member 479 is arranged to contact a fixed actuator 495 mounted on an arm 493 extending from a bracket 494 extending from the abutment 144. The contact of valve member 479 with the fixed actuator 495 moves the valve member 479 against the bias of the spring 481 to a position where the land 488 lies between the passageways 484 and 486 in the valve body 473. A groove 497 is provided between the land 488 and an end land 499 of the valve spool member 479, the groove 497 being intersected by a longitudinal passageway 500 in the spool valve member 479 which passageway 500 intersects the end of the spool valve member 479. At such time, the vacuum against the end of the can body 43 is released to atmosphere and the pusher mandrel 45 will no longer support the can. Such operation of the spool valve member 479 takes place when the transfer is effected by the central transfer wheel 39 to the delivery wheel 188.

Operation

The operation of the machine according to the present invention is believed readily understood with respect to the description foregoing and with particular respect to the details of operation controlled by the cams 361 and 441 at the head stock 40, and the cam 236 at the tail stock 40a, seen in FIG. 31. It should be borne in mind that the cam 361 controlling the operation of the slitter knife 337 on the work spindle 44, and the cam 441 controlling the operation of the trimming roller 426 and rotary knife 428 are located at the head stock 40, and are stationary, the followers controlled thereby revolving with the head stock turret 38. Likewise, the cam 236 in the tail stock 40a controlling the operation of the pusher mandrels 45 is stationary, and the pusher mandrels 45 controlled thereby also revolve with the tail stock turret 41.

The angular displacement of the head stock turret 38, the tail stock turret 41 and the central transfer wheel 39 is related to the profiles of the cams 236, 361, and 441 which are best shown in FIG. 31, the displacement of these several cams being plotted as ordinates and the angular displacement of the turrets 38 and 41 and transfer wheel 39 being plotted as abscissae. For purposes of description at this point the 0° displacement of the head stock turret 38, the central transfer wheel 39 and the tail stock turret 41 is considered to be at a point where the can body 43 enters the central transfer wheel 39, and the operations taking place by the subsequent angular displacement of the same are related to their respective cams and the operations performed by the mechanism controlled thereby as the angular displacement goes from 0° to 360°. It will be understood of course, that the displacement noted and the operations obtaining are for a single typical work spindle 44.

Referring again to FIG. 31, from 0° to 30° of angular displacement, the can body 43 enters the central transfer wheel 39, during which time the pusher mandrel 45 is in its retracted position, as seen in FIG. 21. The profile of the tail stock cam 236 is such as to cause the pusher mandrel 45 to move to the left as seen in FIGS. 7 and 21, to move the can body 43 on to the work spindle 44 from its position in the pocket 133 on the central transfer wheel 39. Concomitant with this motion the cam follower 383 operates the tool slide rod 321 to the right as seen in FIGS. 14 and 20 to move the slitter knife 337 radially outward from its position within the work spindle 44, the slitter knife 337 being in its extreme position of outward radial movement at 86° of angular displacement. Between 86° to 116° the slitter knife 337 retracts back into the work spindle 44 to slit the can body 43 to a prescribed length, which is nicely determined by the rake on the knife edge 419 thereof, and during such retracted movement of the slitter knife 337 the pusher mandrel 45 maintains the can body 43 against the spindle nose plunger 416 seen in FIG. 14.

At from 97° to 112° the profile of the trimming and beading cam 441, seen in FIG. 31, is such that its follower 437 rocks the shaft 423b supporting the corrugating roller 426 and the knife roller 428 in to position against the can body 43 to trim the same to proper length around the periphery thereof, the scrap being corrugated by roller 426 and moving from proximity to the work spindle 44 and the can body 43 at the chute 445 seen in FIG. 23.

Between approximately 150° and 162° of angular displacement the tail stock cam 236 has a profile causing the can body 43 to be retracted slightly on the spindle nose member 323 so that the open end of the can body 43 will turn with respect to the flange sizing ring 329, the movement of the can body 43 past the groove 429 in the spindle nose 323 of work spindle 44 being such as to remove any slight burr on the inside of the can body at the opening thereof to insure the proper formation of a flange 46 thereon.

The retracted position of the can body 43 with the open end thereon turning with respect to flange sizing ring 329 on the spindle nose 323 is maintained between approximately 160° and 192°, at which time the can body 43 is moved to the left as seen in FIG. 14 further on to the spindle nose 323 against the contoured surface or die flanging profile 324 until the can body 43 has the flange 46 formed thereon. The maximum movement of the can body 43 on the spindle nose 323 occurs approximately at 212°, and such movement of the can body 43 in forming the flange 46 thereon is accompanied by movement of the spindle nose plunger 416 seen in FIG. 14 against the bias of the spring 411 surrounding the tool slide rod 321.

The retraction of the can body 43 by the retracting movement of the mandrel 45 occurs between the 212° position of the mandrel 45 and the work spindle 44 and approximately 230°, the flanged opening 46 of the can body 43 resting on the trim ring 329. At this position of can body 43 it can, if desired, be beaded along its length at one or more places by means of the beading roller 430 best seen with reference to FIG. 23, the beading roller 430 being mounted on the shaft 432 supported in the arms 435 and 436 which move with the rock shaft 423b to cause the beading roller 430 to contact the can body. As has been previously described, a plurality of beading rollers 430 may be mounted on the shaft 432 according to the degree of stiffness desired for the can body 43.

For such beading operation the rock shaft 423b is rocked in a direction opposite the direction of movement by corrugating roller 426 and trimming knife 428, seen in FIG. 24. The motion of the cam follower 437 controlling the movement of the rock shaft 423b seen in FIG. 26 commences at 215° of angular displacement of the work spindle 44, and continues contact until 482½° of angular displacement.

As the beading roller 430 commences to move out of contact with the can body 43 at the angular displacement of 261½°, the mandrel 45 commences its retraction to remove the trimmed, flanged and beaded can body 43 from the work spindle 44, the suction being manifested against the bottom of the can body 43 by means of the rubber seal 460 seen in FIG. 21 holding the can body 43 to the end of the pusher mandrel 45. The can body 43 is thus transferred to the pocket 158 on the central transfer wheel 39, the suction against the bottom of the can body 43 being maintained until the transfer is effected between the central transfer wheel 39 and the delivery wheel 188, see particularly FIG. 5. When the completed can body 43 is in the position seen in FIG. 5, the suction against the bottom of the can body is relieved by reason of the actuator 495 which actuates the spool valve member 479 seen in FIG. 21, against the bias of spring 481. The suction against the bottom of the can body 43 is thus relieved to atmosphere through the passageway 500 in the spool valve member 479.

It will thus be seen that this unloading movement of the work spindle 44 by means of the mandrel 45 is completed at approximately 335°, at which time the pusher mandrel 45 returns to a position at 360° to initiate and complete another sequence of operations as previously described.

From the description foregoing it is believed evident that there has been provided a new apparatus and method for completing an open end can body which may have been formed in an impact extruding operation. Such impact extruding operation results in a partly completed can body having an open end thereof requiring trimming to a prescribed length, flanging the can body and beading the can body as described. As has been disclosed, all of the aforesaid operations are done in a continuous fashion and all of the operations of trimming, flanging and beading upon the can body are done on a work spindle where the can body remains for the completion of all of the finishing operations thereon. There is no requirement that the can body be transferred from one work spindle to another work spindle during the performance of the operations thereon.

While the invention has been described in terms of apparatus and method which has been found especially advantageous, the scope of this invention is not intended to be limited to the precise embodiment of the apparatus shown, and the scope of the invention is intended to embrace a process such as can be carried out by apparatus disclosed herein or by equivalents thereto.

What is claimed is:

1. In apparatus of the class described for trimming, flanging and beading can bodies or the like: a rotatably mounted turret having work spindles extending therefrom, a second rotatably mounted turret having longitudinally movable members thereon for advancing a can body on to a work spindle and withdrawing a trimmed, flanged and beaded can body therefrom, can body receiving means disposed between said turrets for receiving a can body for the aforesaid operations and for discharging a finished can body, knife means mounted on said work spindle and movable radially with respect to the normal axis thereof for slitting said can body longitudinally to a predetermined length when one of said longitudinally movable members advances said can body on to the work spindle, means for corrugating the longitudinally slitted portion of said can body and for cutting the same circumferentially along a line as determined by said knife means and beading the same comprising a shaft extending from said first named turret, a corrugating roller and a knife roller spaced from said shaft and supported thereby, a beading roller spaced from said shaft and supported thereby, means for rocking said shaft along with said rollers first in one direction and then the other to trim scrap from an end of said can body and to bead said can body, means on said work spindle operable to deburr the trimmed end of said can body when the same is retracted slightly on said work spindle, and flanging means on said work spindle and operable to place a flange on said can body when said can body is advanced to a predetermined position on said work spindle by said longitudinally movable member.

2. In apparatus of the class described for trimming, flanging and beading can bodies or the like: a rotatably mounted turret having work spindles extending therefrom, a second rotatably mounted turret having longitudinally movable members thereon for advancing a can body on to a work spindle and withdrawing a trimmed, flanged and beaded can body therefrom, can body receiving means disposed between said turrets for receiving a can body for the aforesaid operations and for discharging a finished can body, knife means mounted on said work spindle and movable radially with respect to the normal axis thereof for slitting said can body longitudinally to a predetermined length when one of said longitudinally movable members advances said can body on to the work spindle, means for cutting said can body circumferentially along a line as determined by said knife means and beading the same comprising a shaft extending from said first named turret, a corrugating roller and a knife roller spaced from said shaft and supported thereby, a beading roller spaced from said shaft and supported thereby, means for rocking said shaft along with said rollers first in one direction and then the other to trim scrap from said can body and to bead said can body, and flanging means on said work spindle and operable to place a flange on said can body when said can body is advanced to a predetermined position on said work spindle by said longitudinally movable member.

3. In apparatus of the class described for trimming, flanging and beading can bodies or the like: a rotatably mounted turret having work spindles extending therefrom, a second rotatably mounted turret having longitudinally movable members thereon for advancing a can body on to a work spindle and withdrawing a trimmed, flanged and beaded can body therefrom, knife means mounted on said work spindle and movable radially with respect to the normal axis thereof for slitting said can body longitudinally to a predetermined length when one of said longitudinally movable members advances said can body on to the work spindle, means for corrugating the longitudinally slitted portion of said can body and for cutting the same circumferentially along a line as determined by said knife means and beading said can body comprising a shaft extending from said first named turret, a corrugating roller and a knife roller spaced from said shaft and supported thereby, a beading roller spaced from said shaft and supported thereby, means for rocking said shaft along with said rollers first in one direction and then the other to trim scrap from said can body and to bead said can body, and flanging means on said work spindle and operable to place a flange on said can body when said can body is advanced to a predetermined position on said work spindle by said longitudinally movable members.

4. In apparatus of the class described for trimming, flanging and beading can bodies or the like: a rotatably mounted turret having work spindles extending therefrom, a second rotatably mounted turret having longitudinally movable members thereon for advancing a can body on to a work spindle and withdrawing a trimmed, flanged and beaded can body therefrom, knife means mounted on said work spindle and movable radially with respect thereto for slitting said can body longitudinally to a predetermined length when one of said longitudinally movable members advances said can body on to a work spindle, means for cutting said can body circumferentially along a line as determined by said knife means and beading said can body comprising a shaft extending from said first named turret, a knife roller spaced from said shaft and supported thereby, a beading roller spaced from said shaft and supported thereby, means for rocking said shaft along with said rollers first in one direction and then the other to trim scrap from an end of said can body and to bead said can body, means on said work spindle operable to deburr the trimmed end of said can body when the same is retracted slightly on said work spindle, and flanging means on said work spindle and operable to place a flange on said can body when said can body is advanced to a predetermined position on said work spindle by said longitudinally movable members.

5. Apparatus for trimming and beading can bodies or the like comprising spaced rotatable turrets mounted on a common axis, one of said turrets having at least one work spindle thereon for receiving a can body, the other of said turrets having means thereon for advancing a can body on to said work spindle for the aforesaid operations and for withdrawing a finished can body therefrom, a slitter knife radially movable with respect to the normal axis of said work spindle and adapted to slit said can body longitudinally to a prescribed length when said can body is advanced on to said work spindle, means for controlling the movement of said slitter knife, means for corrugating and trimming a length of scrap from said can body as determined by the slit made by said slitter knife and for beading said can body, said means comprising a shaft extending from said one turret, a corrugating roller and a knife roller movable by said shaft into contact with said can body to corrugate and trim said length of scrap, a beading roller movable by said shaft into contact with said can body to bead the same, and means for rocking said shaft first in one direction and then the other for effecting the corrugating and trimming of a length of scrap and for beading said can body.

6. Apparatus of the class described for trimming and beading can bodies or the like comprising spaced rotatable turrets mounted on a common axis, one of said turrets having at least one work spindle thereon for receiving a can body thereof, the other of said turrets having means thereon for advancing a can body on to said work spindle for the aforesaid operations and for withdrawing a finished can body therefrom, a slitter knife radially movable with respect to the normal axis of said work spindle and adapted to slit said can body longitudinally to a prescribed length when said can body is advanced on to said work spindle, means for controlling the movement of said slitter knife, means for corrugating and slitting a length of scrap from said can body as determined by said slitter knife and beading said can body, said means comprising a shaft extending from said one turret, a corrugating roller and a knife roller spaced from said shaft and supported thereby, a beading roller spaced from said shaft and supported thereby, means for rocking said shaft first in one direction and then the other to trim scrap from said can body and to bead said can body, and suction means on said can body advancing and withdrawing means for removing a can body from said work spindle.

7. Apparatus for trimming and beading can bodies or the like comprising spaced rotatable turrets mounted on a common axis, one of said turrets having at least one work spindle thereon for receiving a can body, the other of said turrets having means thereon for advancing a can body on to said work spindle for the aforesaid operations and for withdrawing a finished can body therefrom, a slitter knife radially movable with respect to the normal axis of said work spindle and adapted to slit said can body longitudinally to a prescribed length when said can body is advanced on to said work spindle, means for controlling the movement of said slitter knife, means for corrugating and trimming a length of scrap from said can body as determined by said slitter knife and beading said can body, said means comprising a shaft extending from said one turret, a corrugating roller and a knife roller spaced from said shaft and supported thereby, a beading roller spaced from said shaft and supported thereby, and means for rocking said shaft first in one direction and then the other to trim scrap from said can body and to bead said can body.

8. A device for trimming the end of a can body comprising a support, a work spindle mounted on the support and adapted to receive a can body, a slitter knife on said work spindle movable radially with respect to the normal axis of said spindle and adapted to slit said can body longitudinally to a prescribed length after said can body has been initially advanced on to said work spindle, means for advancing the can body on the spindle, and means operable after the slitting of said can body for removing a length of scrap from said can body as determined by said slitter knife.

9. A device for trimming the end of a can body as set forth in claim 8, wherein said last mentioned means includes a corrugating roller.

10. Apparatus for trimming and flanging the ends of can bodies or the like comprising spaced rotatable turrets mounted on a common axis, one of said turrets having at least one work spindle thereon for receiving a can body, the other of said turrets having means thereon for advancing a can body on to said work spindle for the aforesaid operations and for withdrawing a finished can body therefrom, a slitter knife on said work spindle and adapted to slit said can body longitudinally to a prescribed length when said can body is advanced on to said work spindle, means for controlling the movement of said slitter knife, means operable after the slitting of said can body for corrugating and removing a length of scrap from said can body as determined by said slitter knife, means for controlling the operation of said last named means, and means operable to place a flange on said can body by further axial movement thereof on said work spindle, and suction means on said can body advancing and withdrawal means for removing a can body from said work spindle.

11. Apparatus of the class described for trimming and flanging the ends of can bodies or the like comprising spaced rotatable turrets mounted on a common axis, one of said turrets having at least one work spindle thereon for receiving a can body, the other of said turrets having means thereon for advancing a can body on to said work spindle for the aforesaid operations and for withdrawing a finished can body therefrom, a slitter knife on said work spindle and adapted to slit said can body longitudinally to a prescribed length when said can body is advanced on to said work spindle, means for controlling the movement of said slitter knife, means for corrugating and slitting a length of scrap from said can body as determined by said slitter knife, means for controlling the operation of said last named means, and means operable to place a flange on said can body by further axial movement thereof on to said work spindle.

12. In apparatus of the class described for trimming and flanging the ends of can bodies or the like: a rotatably mounted turret having work spindles extending therefrom, a second rotatably mounted turret having longitudinally movable members thereon for advancing the can body on to a work spindle and withdrawing a trimmed and flanged can body therefrom, can receiving means disposed between said turrets for receiving a can body for the aforesaid trimming and flanging operations and for discharging a can body which has been trimmed and flanged, knife means mounted on and movable radially of the normal axis of said work spindle for slitting said can body longitudinally to a predetermined length when one of said longitudinally movable members advances said can body on to a work spindle, means for corrugating the longitudinally slitted portion of said can body and for cutting the same circumferentially along a line as determined by said knife means, flanging means on said work spindle and operable to place a flange on said can body when said can body is advanced further on said work spindle, by said longitudinally movable member, and means on said spindle biasing said can body against said longitudinally movable member to hold the can body in a position on the spindle whereby it can be flanged.

13. In apparatus of the class described for trimming and flanging the ends of can bodies or the like: a rotatably mounted turret having work spindles extending therefrom, a second rotatably mounted turret having longitudinally movable members thereon for advancing the can body on to a work spindle and withdrawing a trimmed and flanged can body therefrom, can receiving means disposed between said turrets for receiving a can body for the aforesaid trimming and flanging operations and for discharging a can body which has been trimmed and flanged, knife means mounted on said work spindle for slitting said can body longitudinally to a predetermined length when one of said longitudinally movable members advances said can body on to the work spindle, means for corrugating the longitudinally slitted portion of said can body and for cutting the same circumferentially along a line as determined by said knife means, flanging means on said work spindle and operable to place a flange on said can body when said can body is advanced further on said work spindle by said longitudinally movable member, and means for applying suction to a can body to remove the same from said work spindle at the completion of the aforesaid operations.

14. In apparatus of the class described for trimming and flanging the ends of can bodies or the like: a rotatably mounted turret having work spindles extending therefrom, a second rotatably mounted turret having longitudinally movable members thereon for advancing the can body on to a work spindle and for withdrawing a trimmed and flanged can body therefrom, can receiving means disposed between said turrets for receiving a can body for the aforesaid trimming and flanging operations and for discharging a can body which has been trimmed and flanged, knife means movable radially of the normal axis of and mounted on said work spindle for slitting said can body longitudinally to a predetermined length when one of said longitudinally movable members advances said can body on to the work spindle, means operable after the slitting operation for corrugating the slitted portion of said can body and cutting said can body circumferentially along a line as determined by said knife means, and flanging means on said work spindle and operable after the corrugating and cutting operations to place a flange on said can body when said can body is advanced further on said work spindle by said longitudinally movable member.

15. In apparatus of the class described for trimming and flanging the ends of can bodies or the like: a rotatably mounted turret having work spindles extending therefrom, a second rotatably mounted turret having longitudinally movable members thereon for advancing the can body on to a work spindle and withdrawing a trimmed and flanged can body therefrom, can receiving means disposed between said turrets for receiving a can body for the aforesaid trimming and flanging operations and for discharging a can body which has been trimmed and flanged, knife means movable radially of the normal axis of and mounted on said work spindle for slitting said can body longitudinally to a predetermined length when one of said longitudinally movable member advances said can body on to the work spindle, means for corrugating the longitudinally slitted portion of said can body and for cutting said can body circumferentially along a line as determined by said knife means, means on said work spindle operable to deburr the trimmed end of said can body when the same is retracted spindle, means for corrugating the longitudinally slitted work spindle and operable to place a flange on said can body when said can body is advanced further on said work spindle by said longitudinally movable member.

16. In apparatus of the class described for trimming and flanging an open end of a can body, a rotatably mounted turret having work spindles extending therefrom, a second rotatably movable turret having longitudinally movable members thereon for advancing a can body on to a work spindle, and for withdrawing a trimmed and flanged can body therefrom, means disposed between said turrets for receiving a can body for the aforesaid trimming and flanging operations and for discharging a can body which has been trimmed and flanged, knife means radially disposed on said work spindle for slitting said can body longitudinally to a predetermined length when one of said longitudinally movable members advances said can body on to a work spindle, means for cutting said can body circumferentially along a line as determined by said knife means, and flanging means on said work spindle and operable to place a flange on said can body when said can body is advanced further on said work spindle by said longitudinally movable member.

17. In a machine for trimming and flanging an end of a can body, a work spindle, means for advancing a can body on to said spindle and for removing the same therefrom, knife means movable radially of the normal axis of said spindle and adapted to slit said can body longitudinally thereof when said can body is moved on to said spindle by said advancing means, means coacting with said spindle for circumferentially corrugating and cutting from said can body a scrap piece defined by said knife means, means operable to advance said can body further on said spindle, to flange said can body, and means operable in conjunction with said can body advancing means for placing suction against said can body to remove the can body from said work spindle upon retraction of said can body advancing means.

18. In a machine for trimming and flanging the end of a can body, a work spindle, means for advancing a can body on to said spindle and for removing the same therefrom, knife means mounted on and movable radially of the normal axis of said spindle and adapted to slit said can body longitudinally thereof when said can body is moved on to said spindle by said advancing means, said knife means having a rake therein adapted to slit said body to a predetermined point thereon upon the retractive inward movement of said knife means, means coacting with said spindle and operable after said knife means for circumferentially corrugating and cutting from said can body a scrap piece defined by said knife means, and means operable to advance said can body further on said spindle to flange said can body.

19. In a machine for trimming and flanging the end of a can body, a work spindle, means for advancing a can body on to said spindle and for removing the same therefrom, knife means mounted on and movable radially of said spindle for slitting said can body longitudinally thereof when said can body is moved on to said spindle by said advancing means, means coacting with said spindle for circumferentially corrugating and cutting from said can body a scrap piece defined by said knife means, means operable upon the retraction of said can body from the spindle but while still positioned on said spindle to deburr the trimmed end of said can body, and means operable to advance said can body further on said spindle to flange said can body after the can body has been delivered.

20. In a machine for trimming and flanging the end of a can body, a work spindle, means for advancing a can body on to said spindle and for removing same therefrom, knife means movable radially of said spindle and adapted to slit said can body longitudinally thereof when said can body is moved on to said spindle by said advancing means, means coacting with said spindle for circumferentially cutting from said can body a scrap piece defined by said knife means, and means operable to advance said can body further on said spindle to flange said can body after the cutting of said can body.

21. In a machine for trimming the end of a can body, a work spindle, means for advancing a can body on to said work spindle and for removing the same therefrom, knife means movable radially of the normal axis of said spindle and adapted to slit said can body longitudinally thereof when said can body is initially moved on to said spindle by said advancing means, and means coacting with said spindle for circumferentially corrugating and cutting from said can body a scrap piece as defined by said knife means.

22. In a machine for trimming the end of a can body, a work spindle, means for advancing a can body on to said work spindle and for removing the same therefrom, knife means movable radially of said spindle and adapted to slit said can body longitudinally thereof when said can body is moved on to said spindle by said advancing means, means coacting with said spindle for circumferentially cutting from said can body a scrap piece as defined by said knife means, and means operable in conjunction with said can body advancing means for placing suction against said can body to remove the can body from said work spindle upon retraction of said can body advancing means.

23. A process for circumferentially trimming, flanging and beading hollow bodies such as a can body comprising the steps of feeding a can body on to a work support, slitting the body longitudinally to a prescribed length after the body has been initially advanced on to said support, separating the scrap portion of the can body from the remainder of the can body by corrugating and trimming the scrap portion defined by the prescribed length of can body which is slit, directing said scrap portion away from said support and the remainder of the can body, retracting the can body slightly on said work support to deburr the end of said can body, advancing the can body further on said work support and flanging said can body and subsequently beading the wall of said can body while on said work support.

24. A process for circumferentially trimming, flanging and beading hollow bodies such as a can body, comprising the steps of feeding a can body on to a work spindle, slitting the body longitudinally to a prescribed length as the body advances on to said spindle, separating the scrap portion of the can body from the remainder of the can body by corrugating and trimming the scrap portion as defined by the prescribed length of can body which is slit, advancing the can body further on said work spindle and flanging said body, and subsequently beading the wall of said can body while retaining said body on said work spindle.

25. A process for circumferentially trimming and flanging hollow bodies such as a can body comprising the steps of feeding a can body on to a work spindle, slitting the body longitudinally to a prescribed length as the body advances on to said spindle, separating the scrap portion of the can body from the remainder of the can body by corrugating and trimming the scrap portion as defined by the prescribed length of can body which is slit, retracting the can body slightly on said work spindle, to deburr the end of said can body, and advancing the can body further on said work spindle and flanging said can body.

26. A process for circumferentially trimming and flanging hollow bodies such as a can body comprising the steps of feeding a can body on to a work spindle, slitting the body longitudinally to a prescribed length as the body advances on to said spindle, separating the scrap portion of the can body from the remainder of the can body by corrugating and trimming the scrap portion as defined by the prescribed length of can body which is slit and advancing the can body further on said work spindle and flanging said can body.

27. A process for circumferentially trimming hollow bodies such as a can body which comprises the steps of advancing the can body on to a work support, slitting the body longitudinally to a prescribed length as the body advances on to said support, and thereafter separating the scrap portion of the can body from the remainder of the can body by corrugating and trimming the scrap portion as defined by the prescribed length of can body which is slit and directing the scrap portion of the can body away from the remainder of the can body and the work support.

References Cited in the file of this patent
UNITED STATES PATENTS

| | | |
|---|---|---|
| 1,315,114 | Gray | Sept. 2, 1919 |
| 2,455,768 | Herman | Dec. 7, 1945 |
| 2,686,551 | Laxo | Aug. 17, 1954 |

UNITED STATES PATENT OFFICE
CERTIFICATE OF CORRECTION

Patent No. 3,033,264 May 8, 1962

Henry G. Henrickson

It is hereby certified that error appears in the above numbered patent requiring correction and that the said Letters Patent should read as corrected below.

Column 1, line 50, for "elevaitonal" read -- elevational --; column 7, line 65, for "delievry" read -- delivery --; column 8, line 34, for "structuer" read -- structure --; column 12, line 14, for "bearding" read -- beading --; column 20, line 30, strike out "spindle, means for corrugating the longitudinally slitted" and insert instead -- slightly on said work spindle, and flanging means on said --.

Signed and sealed this 1st day of January 1963.

(SEAL)
Attest:

ERNEST W. SWIDER
Attesting Officer

DAVID L. LADD
Commissioner of Patents